United States Patent
Subramanian et al.

(10) Patent No.: US 11,087,245 B2
(45) Date of Patent: Aug. 10, 2021

(54) PREDICTIVE ISSUE DETECTION

(71) Applicant: Accenture Global Solutions Limited, Dublin (IE)

(72) Inventors: Revathi Subramanian, San Diego, CA (US); Hongrui Gong, San Diego, CA (US); Ibrahim Ali Odeh Al-Shyoukh, Loma Linda, CA (US)

(73) Assignee: Accenture Global Solutions Limited, Dublin (IE)

( * ) Notice: Subject to any disclaimer, the term of this patent is extended or adjusted under 35 U.S.C. 154(b) by 432 days.

(21) Appl. No.: 16/245,953

(22) Filed: Jan. 11, 2019

(65) Prior Publication Data

US 2020/0226503 A1    Jul. 16, 2020

(51) Int. Cl.
| | |
|---|---|
| *G06Q 10/04* | (2012.01) |
| *G06N 20/20* | (2019.01) |
| *G06F 16/387* | (2019.01) |
| *G06Q 40/00* | (2012.01) |
| *G06Q 30/04* | (2012.01) |
| *G06K 9/62* | (2006.01) |

(52) U.S. Cl.
CPC .......... *G06Q 10/04* (2013.01); *G06F 16/387* (2019.01); *G06K 9/6257* (2013.01); *G06N 20/20* (2019.01); *G06Q 30/04* (2013.01); *G06Q 40/12* (2013.12)

(58) Field of Classification Search
CPC ......... G06Q 10/04; G06Q 30/04; G06Q 40/12
See application file for complete search history.

(56) References Cited

U.S. PATENT DOCUMENTS

| | | | |
|---|---|---|---|
| 9,336,302 B1 | 5/2016 | Swamy | |
| 9,460,155 B2 | 10/2016 | Verma et al. | |
| 10,038,611 B1 | 7/2018 | Wu et al. | |
| 10,417,059 B1* | 9/2019 | Arya | G06F 16/2379 |
| 10,516,999 B1 | 12/2019 | Desai | |
| 10,585,979 B2* | 3/2020 | Moyers | G06F 16/35 |
| 10,698,868 B2* | 6/2020 | Guggilla | G06N 20/00 |

(Continued)

OTHER PUBLICATIONS

Appzen, "Audit Every Dollar of Spend," http://www.appzen.com/, Mar. 16, 2018, 7 pages.

(Continued)

*Primary Examiner* — Florian M Zeender
*Assistant Examiner* — Christopher R Buchanan
(74) *Attorney, Agent, or Firm* — Harrity & Harrity, LLP

(57) ABSTRACT

A device may receive data that includes invoice data related to historical invoices from an organization, contact data related to historical contacts between the organization and various entities, and dispute data related to historical disputes between the organization and the various entities. The device may determine a profile for the data. The device may determine a set of supervised learning models for the historical invoices based on one or more of the historical contacts, the historical disputes, the historical invoices, or historical patterns related to the historical invoices. The device may determine, using the profile, a set of unsupervised learning models for the historical invoices independent of the one or more of the historical contacts, the historical disputes, or the historical patterns. The device may determine, utilizing a super model, a prediction for the invoice after the super model is trained. The device may perform one or more actions.

20 Claims, 14 Drawing Sheets

(56) References Cited

U.S. PATENT DOCUMENTS

| | | | |
|---|---|---|---|
| 10,904,298 B2* | 1/2021 | Sondhi | H04L 51/34 |
| 2008/0154957 A1 | 6/2008 | Taylor et al. | |
| 2013/0346287 A1 | 12/2013 | Enzaldo et al. | |
| 2016/0117778 A1 | 4/2016 | Costello et al. | |
| 2016/0358268 A1 | 12/2016 | Verma et al. | |
| 2017/0084167 A1 | 3/2017 | Bump et al. | |
| 2018/0232814 A1* | 8/2018 | Dey | G06Q 40/12 |
| 2018/0322406 A1 | 11/2018 | Merrill et al. | |
| 2018/0350006 A1 | 12/2018 | Agrawal et al. | |
| 2019/0139147 A1* | 5/2019 | Mittal | G06Q 40/12 |

OTHER PUBLICATIONS

CA Technologies, "Application and Infrastructure Monitoring Tools," https://www.ca.com/us/products/application-and-infrastructure-monitoring.html, Feb. 13, 2016, 11 pages.

Hewlett Packard Enterprise Development LP, "HPE OneView," https://www.hpe.com/us/en/integrated-systems/software.html, 2018, 21 pages.

Extended European Search Report for Application No. EP19212369.3, dated Jan. 14, 2020, 9 pages.

* cited by examiner

PREDICTIVE ISSUE DETECTION

BACKGROUND

An organization generates invoices related to goods and/or services offered by the organization. An invoice includes information that identifies the organization, an amount to be paid for the goods and/or services, a recipient of the goods and/or services, a location at which the goods and/or services were provisioned, and/or the like. Payment terms specify an amount of time that the recipient has to provide payment for the goods and/or services and are identified in the invoice.

SUMMARY

According to some possible implementations, a method may comprise: receiving, by a device, data that includes: invoice data related to historical invoices from an organization, contact data related to historical contacts between the organization and various entities for the historical invoices, and dispute data related to historical disputes between the organization and the various entities for the historical invoices; determining, by the device, a profile for the data after receiving the data, wherein the profile includes a set of groupings of the data by a set of attributes included in the data; determining, by the device and using the profile, a set of supervised learning models for the historical invoices based on one or more of: the historical contacts, the historical disputes, or historical patterns related to the historical invoices, wherein the set of supervised learning models is associated with training a super model to make a prediction for an invoice in a context of the one or more of the historical contacts, the historical disputes, or the historical patterns; determining, by the device and using the profile, a set of unsupervised learning models for the historical invoices independent of the one or more of the historical contacts, the historical disputes, or the historical patterns, wherein the set of unsupervised learning models is associated with training the super model to make the prediction for the invoice independent of the context of the one or more of the historical contacts, the historical disputes, or the historical patterns; determining, by the device and utilizing the super model, the prediction for the invoice after the super model is trained using the set of supervised learning models and the set of unsupervised learning models, wherein the prediction indicates a likelihood of at least one type of issue being associated with the invoice; and performing, by the device, one or more actions based on the prediction.

According to some possible implementations, a device may comprise: one or more memories; and one or more processors, communicatively coupled to the one or more memories, to: receive data that is related to training a super model to determine a prediction of at least one type of issue being associated with an invoice; determine a profile for the data after receiving the data, wherein the profile includes a set of groupings of the data by a set of attributes included in the data; determine, using the profile, a set of supervised learning models for historical invoices based on at least one of: historical patterns related to the historical invoices, historical contacts related to historical issues associated with the historical invoices, or historical disputes related to the historical invoices, wherein the set of supervised learning models is associated with training the super model to make the prediction for the invoice in a context of the at least one of the historical patterns, the historical contacts, or the historical disputes; determine, using the profile, a set of unsupervised learning models for the historical invoices independent of the at least one of the historical patterns, the historical contacts, or the historical disputes, wherein the set of unsupervised learning models is associated with training the super model to make the prediction for the invoice independent of the at least one of the context of the historical patterns, the historical contacts, or the historical disputes; generate, utilizing the super model, the prediction for the invoice by processing invoice-related data after the super model is trained using the set of supervised learning models and the set of unsupervised learning models, wherein the at least one type of issue includes at least one of: a late payment associated with the invoice, the late payment after a particular time, or an amount of time for the late payment; and rank the invoice relative to one or more other invoices based on being predicted to be associated with the at least one type of issue based on the prediction.

According to some possible implementations, a non-transitory computer-readable medium storing instructions, the instructions comprising: one or more instructions that, when executed by one or more processors, cause the one or more processors to: receive invoice-related data that is to be processed by a super model to determine a prediction of at least one type of issue being associated with an invoice, wherein the super model has been trained on data related to: historical invoices from an organization, historical contacts between the organization and various entities for the historical invoices, and historical disputes between the organization and the various entities for the historical invoices; process, using a set of supervised learning models, the invoice-related data after receiving the invoice-related data, wherein the set of supervised learning models has been trained to make the prediction for the invoice in a context of one or more of the historical contacts, the historical disputes, or historical patterns; process, using a set of unsupervised learning models, the invoice-related data after processing the set of supervised learning models, wherein the set of unsupervised learning models has been trained to make the prediction for the invoice independent of the context of the one or more of the historical patterns, the historical contacts, or the historical disputes; process, using the super model, output from the set of supervised learning models and the set of unsupervised learning models to make the prediction of the at least one type issue being associated with the invoice after processing the invoice-related data using the set of supervised learning models and the set of unsupervised learning models; and perform one or more actions based on the prediction.

DETAILED DESCRIPTION

Figure 1A:
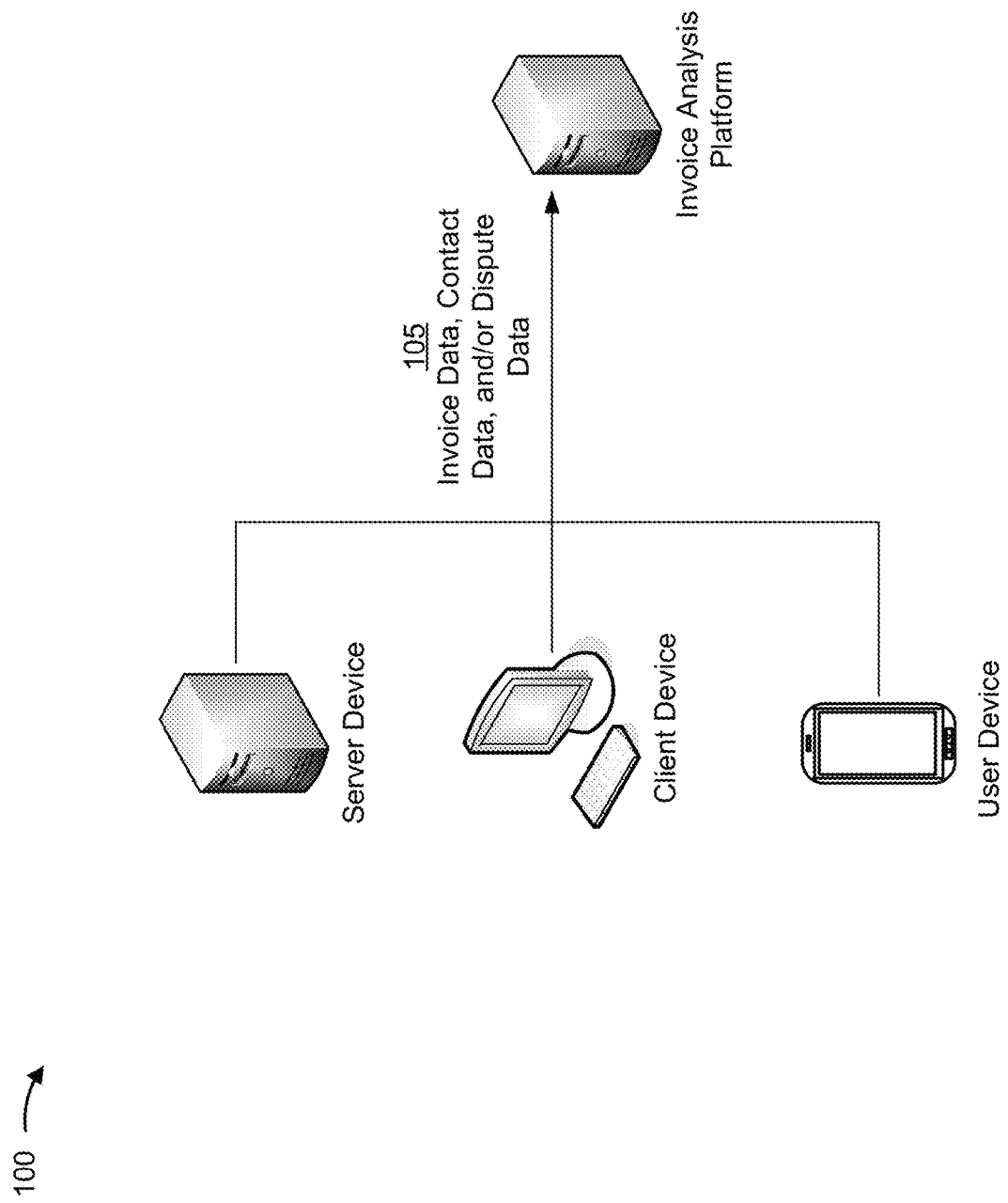
FIGS. 1A-1G are diagrams of an example implementation described herein.

The following detailed description of example implementations refers to the accompanying drawings. The same reference numbers in different drawings may identify the same or similar elements.

An organization can generate hundreds, thousands, or more invoices on a daily, monthly, or yearly basis. For example, the organization may generate the invoices for goods and/or services provisioned by the organization. Timely collection of amounts related to the invoices is needed to ensure uninterrupted operations of the organization. With limited resources available to the organization (e.g., computing resources, human resources, money, and/or the like), the organization may want to prioritize collection of unpaid amounts so as to efficiently use the limited resources, to maximize a total amount collected, and/or the like. However, with hundreds, thousands, or more invoices generated at the rate described above, the amount of data needed to be processed to prioritize the collection for the invoices can easily overload conventional computing devices (e.g., can consume an excessive amount of computing resources, can cause a conventional computing device to crash, and/or the like), can take an excessive amount of time using the conventional computing resources (e.g., delays due to use of the conventional computing resources for other tasks), and/or the like, thereby making prioritization of the invoices and/or predictions related to the invoices difficult, if not impossible.

Some implementations described herein provide an invoice analysis platform that is capable of processing data related to hundreds, thousands, or more invoices to predict which invoices are likely to be associated with an issue, to prioritize collection of unpaid amounts associated with the invoices, to generate a collection plan for collecting the unpaid amounts, and/or the like in real-time or near real-time (e.g., as the invoices are generated). In this way, the invoice analysis platform provides a tool that facilitates quick prediction related to the invoices and/or prioritization of the invoices, pre-staging and/or efficient deployment of resources associated with an organization related to collecting the unpaid amounts, and/or the like. Utilizing the invoice analysis platform in this manner reduces an amount of time needed to make predictions and/or determine prioritizations for the invoices. In addition, utilizing the invoice analysis platform in this manner conserves computing resources that would otherwise be wasted attempting to make the predictions and/or to determine the prioritizations using conventional computing devices. Further, using the invoice analysis platform in this manner conserves resources associated with an organization that would otherwise be wasted via a less efficient deployment of the resources. Further, the invoice analysis platform can improve an accuracy of prioritization and/or collection of invoices, thereby conserving time, computing resources, and/or the like that would otherwise be consumed relative to not using the invoice analysis platform.

Further, in this way, the invoice analysis platform removes human subjectivity and waste from determining prioritizations for invoices, and may improve speed and efficiency of the process and conserve computing resources (e.g., processor resources, memory resources, and/or the like). Furthermore, implementations described herein use a rigorous, computerized process to perform tasks or roles that were not previously performed, thereby providing a new tool for analysis of invoices generated by an organization. Further, a process for determining a prediction and/or a prioritization conserves computing resources (e.g., processor resources, memory resources, and/or the like) of a device that would otherwise be wasted in attempting to use another technique to process data related to an invoice generated by the organization and/or to inefficiently collect an unpaid amount associated with the invoice.

FIGS. 1A-1G are diagrams of an example implementation 100 described herein. As shown in FIG. 1A, implementation 100 includes a server device, a client device, a user device, and an invoice analysis platform.

As shown by reference number 105, the invoice analysis platform may receive data, such as invoice data, contact data, dispute data, and/or the like. For example, the invoice data may be related to historical invoices generated by an organization. Continuing with the previous example, the invoice data may identify the historical invoices, respective amounts for the historical invoices, respective goods and/or services associated with the historical invoices, respective recipients of the goods and/or services, respective locations of the respective recipients and/or to which the respective goods and/or services were provided, respective issue dates for the historical invoices, respective payment dates for the historical invoices, whether the historical invoices were overdue at any time, and/or the like. Additionally, or alternatively, and as another example, the contact data may be related to historical contacts between the organization and various entities for the historical invoices. Continuing with the previous example, the contact data may identify respective dates and/or types of contacts (e.g., a telephone call, an email, a text, a letter, a web portal notification, an in-person visit, and/or the like) between entities (e.g., organizations, individuals, government entities, and/or the like) associated with a historical invoice, whether the historical contacts were successful in resulting in payment of the respective amounts, a quantity of contacts between the entities, and/or the like.

Additionally, or alternatively, and as another example, the dispute data may be related to historical disputes between entities associated with a historical invoice. Continuing with the previous example, the dispute data may identify whether any of the historical invoices were disputed, aspects of an invoice that were (or are being) disputed, whether the dispute was resolved, a date on which the dispute was resolved, and/or the like.

Additionally, or alternatively, the invoice analysis platform may receive data that identifies historical patterns of issues that were predicted to be associated with the historical invoices, whether the historical patterns were accurate, and/or the like. For example, the invoice analysis platform may receive data that identifies historical patterns as to whether particular historical invoices were to be paid on-time, a quantity of days, weeks, or months that payments for historical invoices were expected to be outstanding, collection actions that were predicted to be successful for collecting payments for historical invoices, and/or the like. In some implementations, the invoice analysis platform may receive the data from the server device, the client device, and/or the user device. In some implementations, the invoice analysis platform may receive the data based on requesting the data, according to a schedule, periodically, and/or the like. Additionally, or alternatively, the invoice analysis platform may receive data related to characteristics and/or demographics of an entity, such as a size of an organization, an income level of an individual, a gender of an individual, an age of an individual, and/or the like.

In some implementations, the invoice analysis platform may receive the data in various forms. For example, the invoice analysis platform may receive the data in the form of an image (e.g., an image of an invoice, an image of a document associated with a contact and/or a dispute, and/or the like), as text (e.g., as text of an invoice from an invoicing system, text of a document related to a contact and/or a dispute, and/or the like), as application data from an application hosted on, executed on, and/or the like the server device, the client device, and/or the user device, as input to the invoice analysis platform (e.g., via a user interface associated with the invoice analysis platform), as tabular data (e.g., in the form of a spread sheet file, a comma-separated values (CSV) file, and/or the like), and/or the like. In some implementations, when receiving the data, the invoice analysis platform may receive thousands, millions, or more data elements for thousands, millions, or more invoices. In this way, the invoice analysis platform may process a data set that may overload conventional computing resources.

Figure 1B:
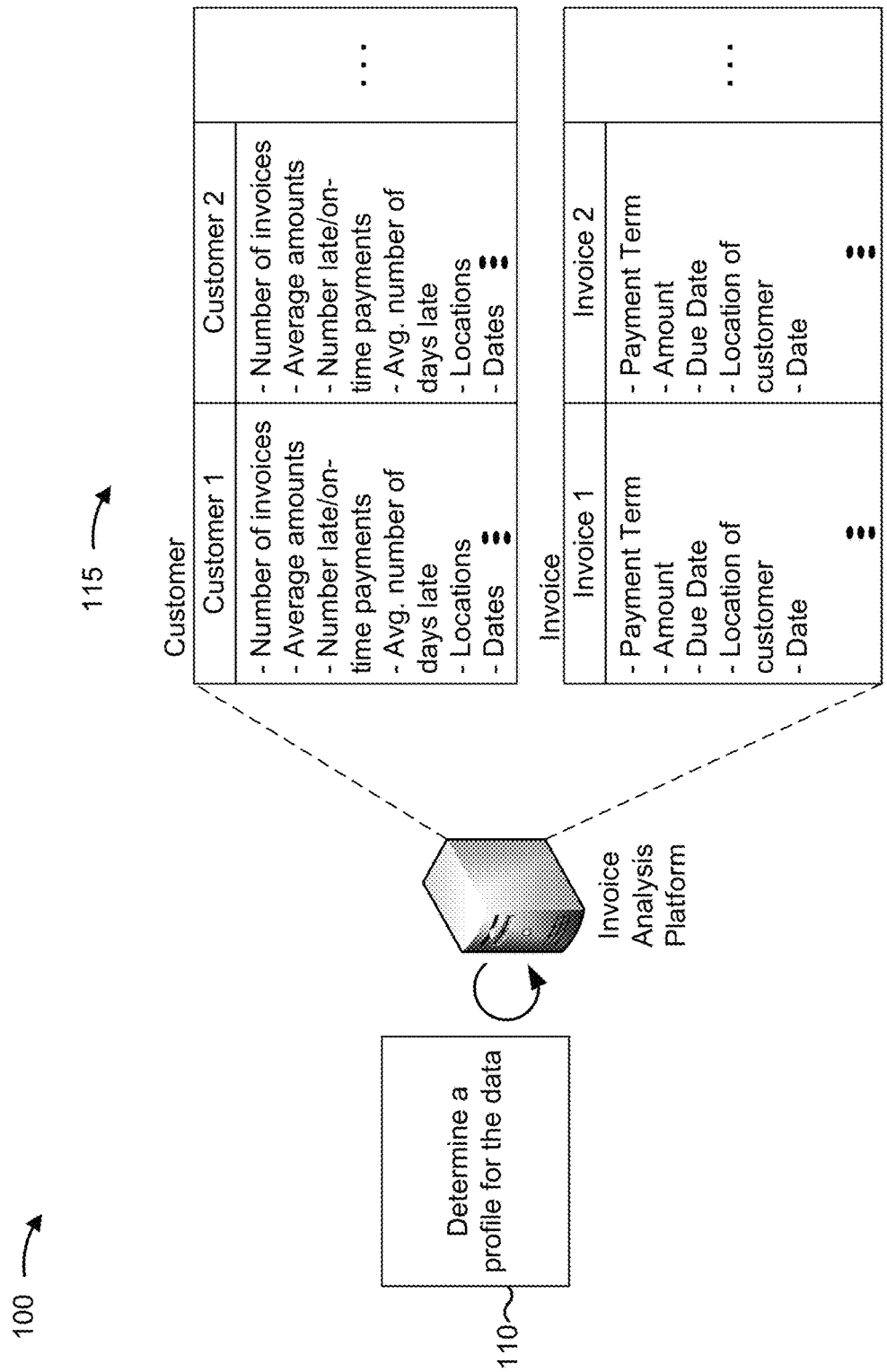

Turning to FIG. 1B, and as shown by reference number 110, the invoice analysis platform may determine a profile for the data. For example, the invoice analysis platform may determine the profile for the data after receiving the data. In some implementations, a profile may include a set of groupings of the data by a set of attributes included in the data. For example, the profile may organize data related to historical invoices, historical contacts, historical disputes, historical patterns, and/or the like by entity (e.g., by entity that provisioned goods and/or services related to a historical invoice, by entity that received the goods and/or services, and/or the like), location (e.g., by location of an entity associated with a historical invoice, by location to which goods and/or services associated with a historical invoice were provided, and/or the like), by goods and/or services associated with the historical invoices, and/or the like. Continuing with the previous example, a profile for a recipient of goods and/or services may include data related to historical invoices associated with the recipient, historical contacts related to collecting payments for the historical invoices associated with the recipient, historical disputes between the recipient and organizations that generated the historical invoices, and/or the like. Additionally, or alternatively, the invoice analysis platform may organize the data by an amount associated with historical invoices (e.g., amounts to be paid for goods and/or services associated with the historical invoices, amounts by which the historical invoices were underpaid, and/or the like).

In some implementations, the invoice analysis platform may organize the data for the profile based on unique identifiers included in the data (e.g., unique identifiers that uniquely identify an entity associated with the data, a location associated with the data, an invoice associated with the data, and/or the like). In some implementations, the unique identifiers may be included in the data as attributes of the data (e.g., as a field with a unique value, such as a name, an identification number, and/or the like), and the invoice analysis platform may organize the data based on the unique identifiers included as the attributes in the data.

Additionally, or alternatively, the invoice analysis platform may process the data to identify the unique identifiers. For example, the invoice analysis platform may process images using an image processing technique, such as a computer vision technique, a feature detection technique, an optical character recognition (OCR) technique, and/or the like to identify an alphanumeric string, a symbol, a code (e.g., a barcode, a matrix barcode, and/or the like) in the image (e.g., that identify the presence of a unique identifier, that are a unique identifier, and/or the like). Continuing with the previous example, the invoice analysis platform may compare the alphanumeric string, the symbol, the code, and/or the like to information stored in a data structure and/or in memory resources of the invoice analysis platform to determine which unique identifiers are included in the image.

Additionally, or alternatively, and as another example, the invoice analysis platform may process the data using a text processing technique, such as a natural language processing technique, a text analysis technique, and/or the like. Continuing with the previous example, the invoice analysis platform may process the text to identify an alphanumeric string, a symbol, a code, and/or the like included in the data (e.g., that indicate a presence of a unique identifier, that are a unique identifier, and/or the like), and may identify the unique identifiers included in the text in a manner similar to that described above.

Additionally, or alternatively, and as another example, the invoice analysis platform may process the data using a model (e.g., a machine learning model, an artificial intelligence model, and/or the like) to identify a unique identifier included in the data. For example, the invoice analysis platform may use the model to process an image and/or text to identify an alphanumeric string, a symbol, a code, and/or the like included in the data, to identify an area of the data (e.g., an area of an image and/or text) that likely includes a unique identifier, and/or the like (e.g., based on having been trained to identify unique identifiers in the data, a likely area in the data that may include a unique identifier, and/or the like). In some implementations, the model and/or training of the model may be similar to that described elsewhere herein.

Reference number 115 shows example profiles that the invoice analysis platform may generate. As shown, a profile may organize the data that the invoice analysis platform received by customer, by invoice, and/or the like. In this way, a profile facilitates quick and easy access to data in an organized manner. This conserves processing resources of the invoice analysis platform relative to not using a profile, facilitates training of a model to identify issues in an invoice based on attributes included in the data (e.g., the invoice analysis platform may train the model on a particular customer or customers generally, on a particular invoice or invoices generally, and/or the like), thereby improving an accuracy of the model with regard to predicting issues that may occur with invoices.

Figure 1C:
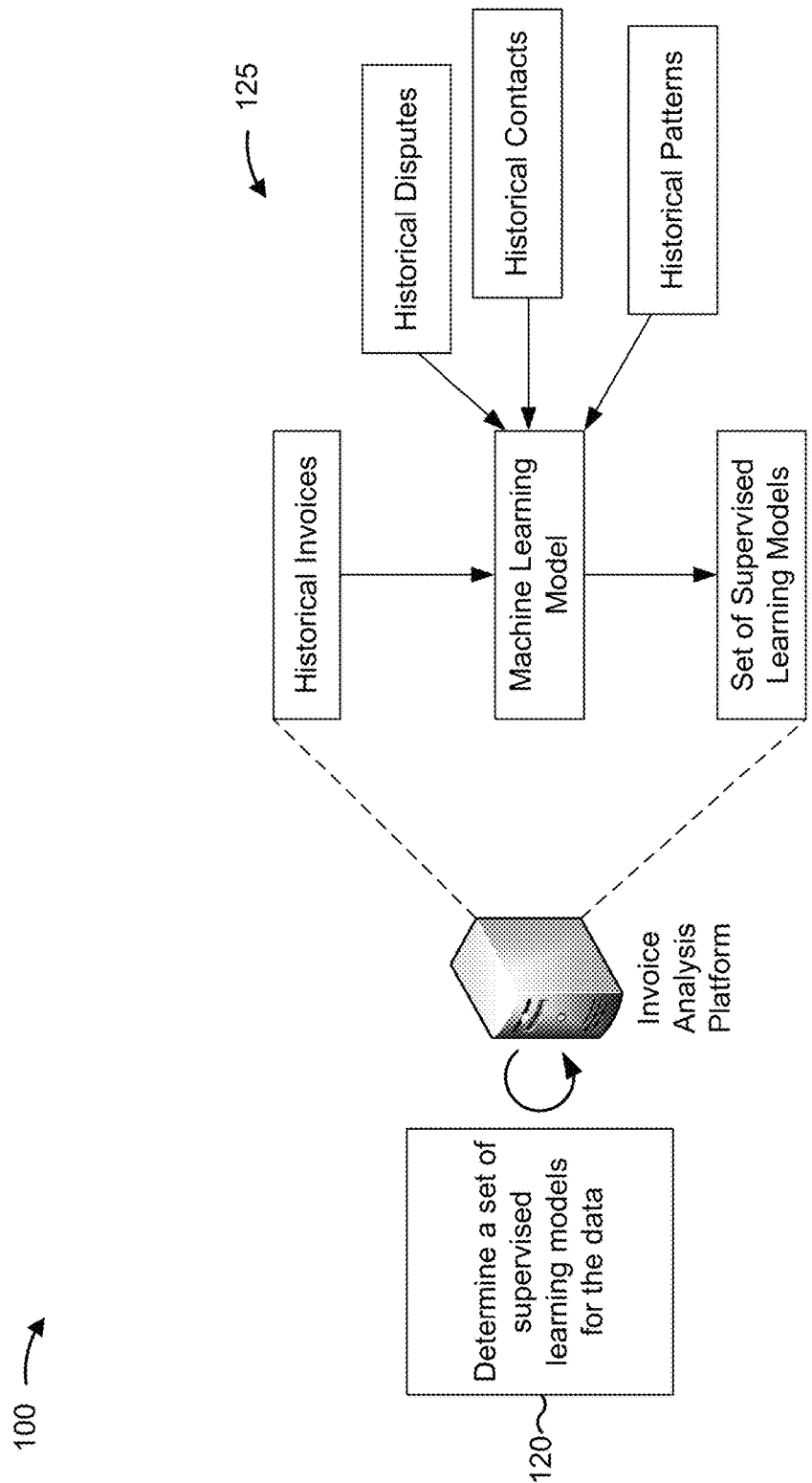

Turning to FIG. 1C, and as shown by reference number 120, the invoice analysis platform may determine a set of supervised learning models for the data. For example, the invoice analysis platform may determine the set of supervised learning models after determining the profile. In some implementations, a supervised learning model may include a model trained, via supervised learning, on features of the data related to predicting an issue for an invoice. For example, a supervised learning model may be trained on a pattern of invoices for an entity, a location, and/or the like (e.g., amounts of the invoices, amounts of days the invoices were (or are) outstanding, quantities and/or types of contacts related to the invoices, disputes related to the invoices, and/or the like). In some implementations, the set of supervised learning models may be used to make a prediction for an invoice in a context of historical contacts, historical disputes, historical invoices, historical patterns, and/or the like. For example, the set of supervised learning models may be trained to predict whether an invoice will be paid on-time, a quantity of days the invoice will be outstanding, types of collection actions that are likely to result in collection of an unpaid amount associated with the invoice, and/or the like.

As shown by reference number 125, the invoice analysis platform may input data related to the historical invoices, the historical disputes, the historical contacts, and/or the historical patterns into a machine learning model to determine the set of supervised learning models. For example, the invoice analysis platform may input the data related to the historical invoices, the historical disputes, the historical contacts, and/or the historical patterns to train the machine learning model (e.g., to generate the set of supervised machine learning models).

In some implementations, when processing the data related to the historical invoices, the historical disputes, the historical contacts, and/or the historical patterns, the machine learning model may group the historical invoices, the historical disputes, and/or the historical contacts by historical patterns. For example, the machine learning model may group, utilizing the data related to the historical invoices, the historical disputes, and/or the historical contacts, the data based on whether the invoice analysis platform accurately made historical patterns for the historical invoices, the historical disputes, and/or the historical contacts.

In some implementations, the invoice analysis platform may use the profile for the data as the input to the machine learning model. This facilitates generation of the set of supervised learning models for different attributes included in the data, which can make the supervised learning models more dynamic, can improve an accuracy of the set of supervised learning models, and/or the like.

In some implementations, prior to inputting the data related to the historical invoices, the historical disputes, and/or the historical contacts, the invoice analysis platform may prepare and/or pre-process the data. For example, the invoice analysis platform may identify keywords included in the data, such as unique identifiers that are common across the data related to the historical invoices, the historical disputes, the historical patterns, and/or the historical contacts, terms that identify accurate historical patterns, terms that identify inaccurate historical patterns, amounts associated with a historical invoice, a historical contact, a historical dispute, and/or a historical pattern, locations associated with the historical invoices, the historical contacts, and/or the historical disputes, and/or the like. Additionally, or alternatively, the invoice analysis platform may remove leading and/or trailing spaces from text included in the data related to the historical invoices, the historical disputes, the historical patterns, and/or the historical contacts, may remove non-American Standard Code for Information Interchange (ASCII) characters from the data, and/or the like. This facilitates quick and/or easy processing of the data related to the historical invoices, the historical disputes, the historical patterns, and/or the historical contacts by making the data more uniform, thereby facilitating fast determination of the set of supervised learning models, more accurate determination of the set of supervised learning models, and/or the like.

In some implementations, the invoice analysis platform may generate the set of supervised learning models by training the machine learning model. For example, the invoice analysis platform may train the machine learning model to generate the set of supervised learning models from the data related to the historical invoices, the historical disputes, the historical contacts, and/or the historical patterns.

In some implementations, the invoice analysis platform may train the machine learning model on a training set of data. For example, the training set of data may include data related to historical invoices, historical contacts, and historical disputes, and data that identifies historical patterns related to the historical invoices, the historical disputes, and/or the historical contacts. Additionally, or alternatively, when the invoice analysis platform inputs the data related to the historical invoices, the historical disputes, the historical contacts, and/or the historical patterns into the machine learning model, the invoice analysis platform may input a first portion of the data as a training set of data, a second portion of the data as a validation set of data, and third portion of the data as a test set of data (e.g., to be used to determine the set of supervised learning models). In some implementations, the invoice analysis platform may perform multiple iterations of training of the machine learning model, depending on an outcome of testing of the machine learning model (e.g., by submitting different portions of the data as the training set of data, the validation set of data, and the test set of data).

In some implementations, when training the machine learning model, the invoice analysis platform may utilize a random forest classifier technique to train the machine learning model. For example, the invoice analysis platform may utilize a random forest classifier technique to construct multiple decision trees during training and may output a classification of data. Additionally, or alternatively, when training the machine learning model, the invoice analysis platform may utilize one or more gradient boosting techniques to generate the machine learning model. For example, the invoice analysis platform may utilize an xgboost classifier technique to generate a prediction model from a set of weak prediction models.

In some implementations, when training the machine learning model, the invoice analysis platform may utilize logistic regression to train the machine learning model. For example, the invoice analysis platform may utilize a binary classification of the data related to the historical invoices, the historical disputes, the historical contacts, and/or the historical patterns (e.g., whether the historical invoices, the historical disputes and/or the historical contacts match the historical patterns) to train the machine learning model to determine the set of supervised learning models based on the classification of the data. Additionally, or alternatively, when training the machine learning model, the invoice analysis platform may utilize a Naive Bayes classifier to train the machine learning model. For example, the invoice analysis platform may utilize binary recursive partitioning to divide the data related to historical invoices, the historical disputes, the historical contacts, and/or the historical patterns into various binary categories (e.g., starting with an accurate or inaccurate binary category for historical patterns related to the historical invoices, the historical disputes, and/or the historical contacts). Based on using recursive partitioning, the invoice analysis platform may reduce utilization of computing resources relative to manual, linear sorting and analysis of data points, thereby enabling use of thousands, millions, or billions of data points to train a machine learning model, which may result in a more accurate machine learning model than using fewer data points.

Additionally, or alternatively, when training the machine learning model, the invoice analysis platform may utilize a support vector machine (SVM) classifier. For example, the invoice analysis platform may utilize a linear model to implement non-linear class boundaries, such as via a max margin hyperplane. Additionally, or alternatively, when utilizing the SVM classifier, the invoice analysis platform may utilize a binary classifier to perform a multi-class classification. Use of an SVM classifier may reduce or eliminate overfitting, may increase a robustness of the machine learning model to noise, and/or the like.

In some implementations, the invoice analysis platform may train the machine learning model using a supervised training procedure that includes receiving input to the machine learning model from a subject matter expert. In some implementations, the invoice analysis platform may use one or more other model training techniques, such as a neural network technique, a latent semantic indexing technique, and/or the like. For example, the invoice analysis platform may perform a multi-layer artificial neural network processing technique (e.g., using a two-layer feedforward neural network architecture, a three-layer feedforward neural network architecture, and/or the like) to perform pattern recognition with regard to patterns of supervised learning models, patterns of supervised learning models based on an accuracy of a historical patterns, and/or the like. In this case, using the artificial neural network processing technique may improve an accuracy of a supervised learning model generated by the invoice analysis platform by being more robust to noisy, imprecise, or incomplete data, and by enabling the invoice analysis platform to detect patterns and/or trends undetectable to human analysts or systems using less complex techniques.

As an example, the invoice analysis platform may use a supervised multi-label classification technique to train the machine learning model. For example, as a first step, the invoice analysis platform may map data associated with the historical invoices, the historical disputes, the historical contacts, and/or the historical patterns to a set of previously generated supervised learning models after labeling the historical invoices, the historical disputes, the historical contacts, and/or the historical patterns. In this case, the historical invoices, the historical disputes, and/or the historical contacts may be characterized as having been accurately or inaccurately predicted, the historical patterns may be characterized as having been accurate or inaccurate, and/or the like (e.g., by a technician, thereby reducing processing relative to the invoice analysis platform being required to analyze each historical invoice, historical contact, historical dispute, and/or historical pattern). As a second step, the invoice analysis platform may determine classifier chains, whereby labels of target variables may be correlated (e.g., in this example, labels may be a result of a historical pattern and correlation may refer to supervised learning models common to the different labels, and/or the like). In this case, the invoice analysis platform may use an output of a first label as an input for a second label (as well as one or more input features, which may be other data relating to the historical invoices, the historical disputes, the historical contacts, and/or the historical patterns), and may determine a likelihood that a particular historical invoice is to be associated with at least one type of issue and/or is associated with a set of supervised learning models based on a similarity to other historical invoices that include similar data. In this way, the invoice analysis platform transforms classification from a multilabel-classification problem to multiple single-classification problems, thereby reducing processing utilization. As a third step, the invoice analysis platform may determine a Hamming Loss Metric relating to an accuracy of a label in performing a classification by using the validation set of the data (e.g., an accuracy with which a weighting is applied to each historical invoice, historical dispute, historical contact, and/or historical pattern and whether each historical invoice, historical contact, and/or historical dispute is associated with an issue, results in a correct historical pattern, and/or the like, thereby accounting for variations among historical invoices, historical contacts, and/or historical disputes). As a fourth step, the invoice analysis platform may finalize the machine learning model based on labels that satisfy a threshold accuracy associated with the Hamming Loss Metric, and may use the machine learning model for subsequent determination of supervised learning models.

Figure 1D:
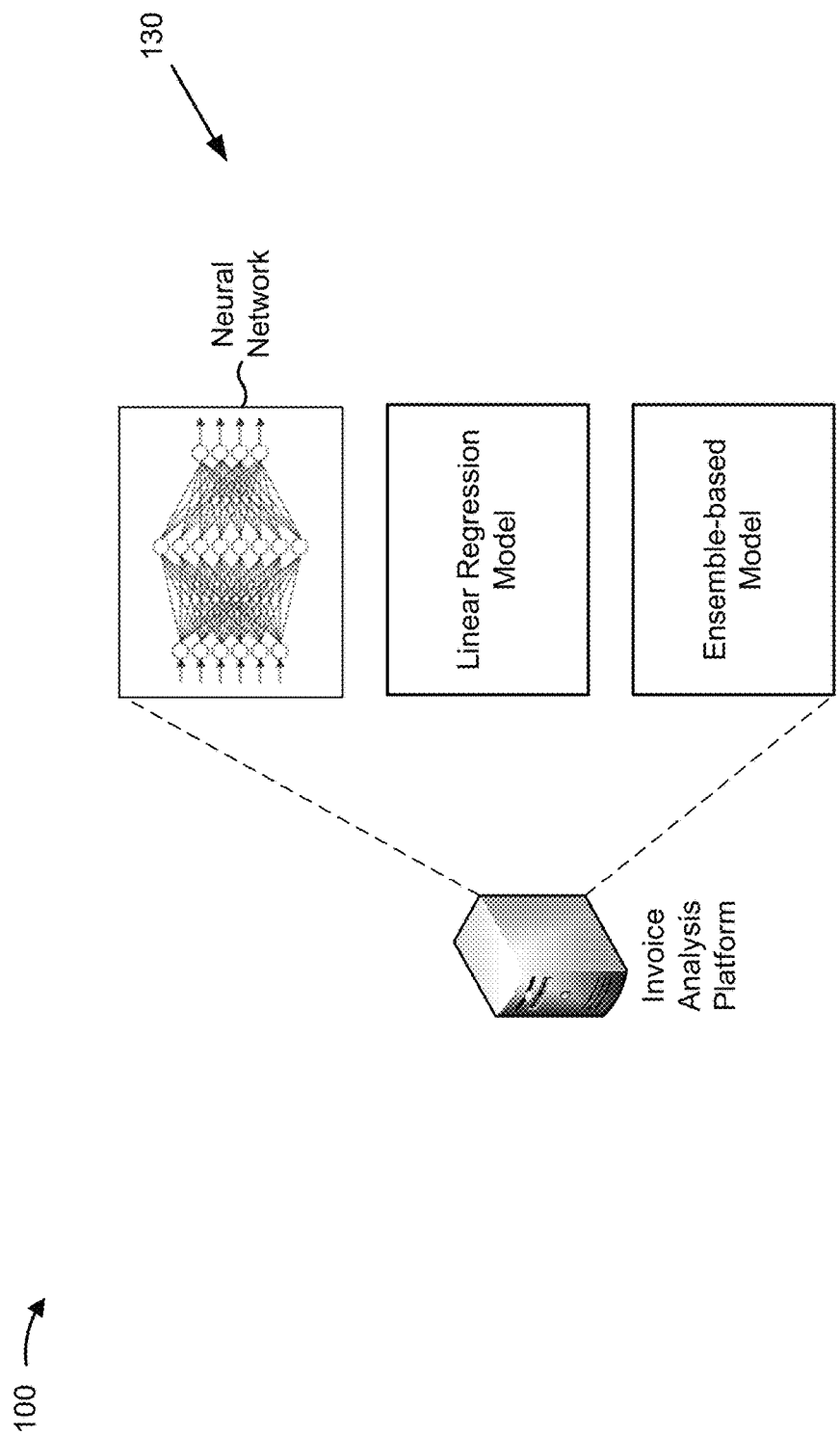

Turning to FIG. 1D, and as shown by reference number 130, the set of supervised learning models may include various types of models. For example, the set of supervised learning models may include a neural network, where nodes of the neural network are trained and are used to process data related to an invoice to make a prediction related to the invoice. Additionally, or alternatively, and as another example, the set of supervised learning models may include a linear regression model. For example, the linear regression model may be trained on an assumption of a linear relationship between two variables. Additionally, or alternatively, and as another example, the set of supervised learning models may include an ensemble-based model. For example, the ensemble-based model may combine multiple other models described herein into a single model.

In some implementations, output from the set of supervised learning models may identify a likelihood that an invoice is to be associated with an issue, a type of the issue predicted to be associated with the invoice, and/or the like. Continuing with the previous example, the set of supervised learning models may indicate that historical invoices from a particular country are associated with a high likelihood of needing particular types of contacts to remedy underpayments related to the historical invoices, a quantity of days that historical invoices were outstanding, and/or the like. Additionally, or alternatively, and as another example, the invoice analysis platform may determine a pattern of on-time and overdue historical invoices by attribute included in the data. Continuing with the previous example, the invoice analysis platform may determine that a first pattern of data related to historical invoices, historical contacts, and/or historical disputes (e.g., a pattern of amounts, locations, dates, and/or the like) for an entity is associated with a low likelihood of being associated with an issue, may determine that a second pattern of data related to historical invoices, historical contacts, and/or historical disputes for the entity is associated with a high likelihood of being associated with an issue (e.g., a pattern that deviates from the first pattern), and/or the like.

Figure 1E:
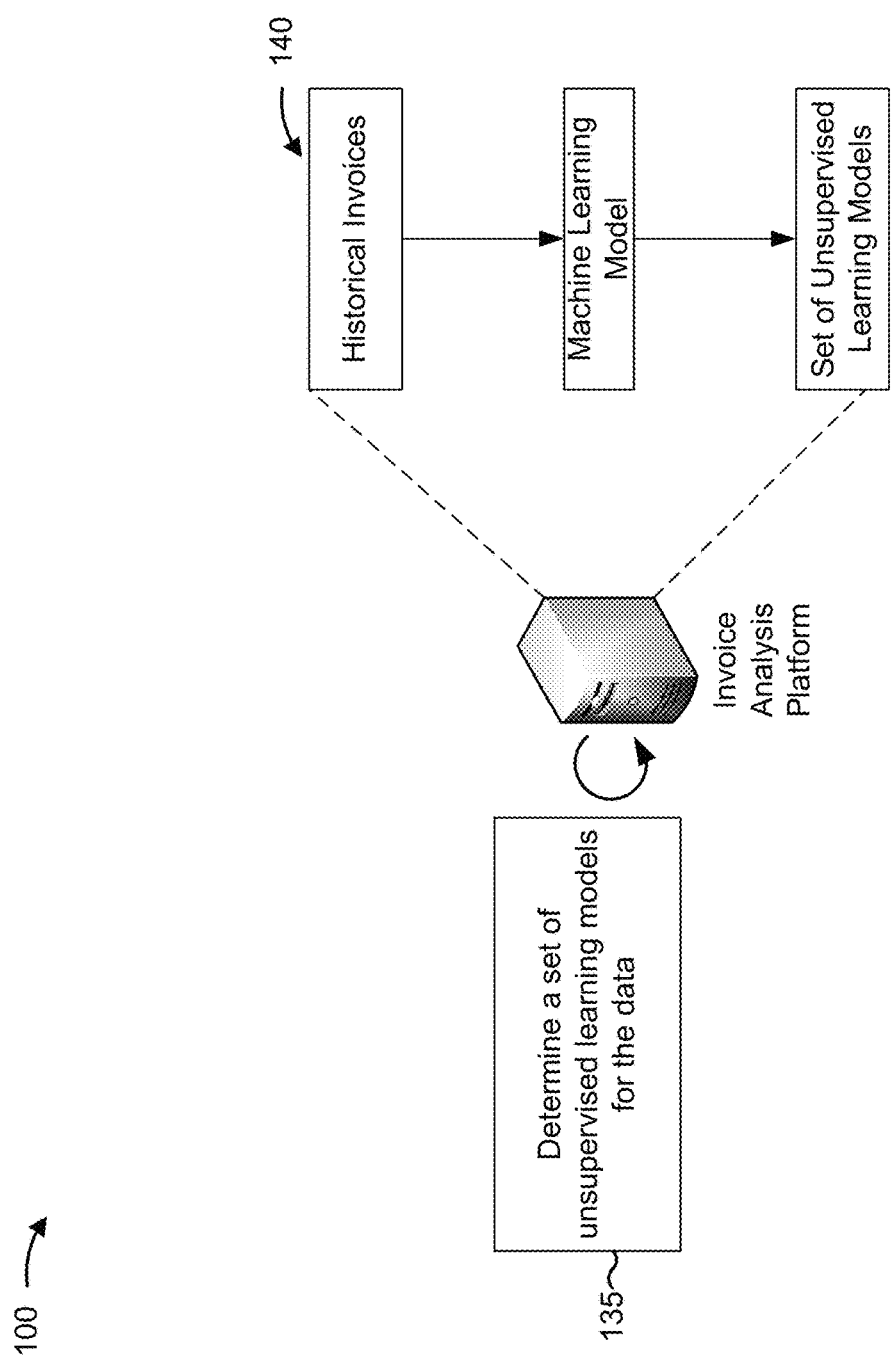

Turning to FIG. 1E, as shown by reference number 135, the invoice analysis platform may determine a set of unsupervised learning models for the data. For example, the invoice analysis platform may determine the set of unsupervised learning models in a manner that is the same as or similar to that described elsewhere herein with regard to the set of supervised learning models. In some implementations, the invoice analysis platform may determine the set of unsupervised learning models independent of the historical contacts, the historical disputes, and/or the historical patterns. For example, the invoice analysis platform may be trained on patterns of data related to the historical invoices without regard to whether the historical invoices are associated with historical contacts, historical disputes, accurate or inaccurate historical patterns, and/or the like. In some implementations, the set of unsupervised learning models may be used to make predictions for an invoice without the context of the historical contacts, the historical disputes, and/or the historical patterns (e.g., without categorization of the invoice as having similar patterns of data to a historical invoice that is associated with a set of historical contacts, a set of historical disputes, a set of accurate or inaccurate historical patterns, and/or the like). In some implementations, the set of unsupervised learning models may be associated with training a super model to make predictions independent of the context of the historical contacts, the historical disputes, and/or the historical patterns. As a result, the set of unsupervised learning models may identify new, unusual, and/or abnormal behavior and/or patterns in the historical invoices, which were missed by the historical patterns, that were not associated with historical disputes and/or historical contacts, and/or the like.

As shown by reference number 140, the invoice analysis platform may determine the set of unsupervised learning models by processing data related to historical invoices using a machine learning model. In some implementations, the machine learning model may be similar to that described elsewhere herein. For example, the machine learning model may output a set of unsupervised learning models determined from the data related to the historical invoices. In some implementations, the invoice analysis platform may input the profile for the data related to the historical invoices to the machine learning model to determine the set of unsupervised learning models, in a manner that is the same as or similar to that described elsewhere herein with regard to the set of supervised learning models.

Figure 1F:
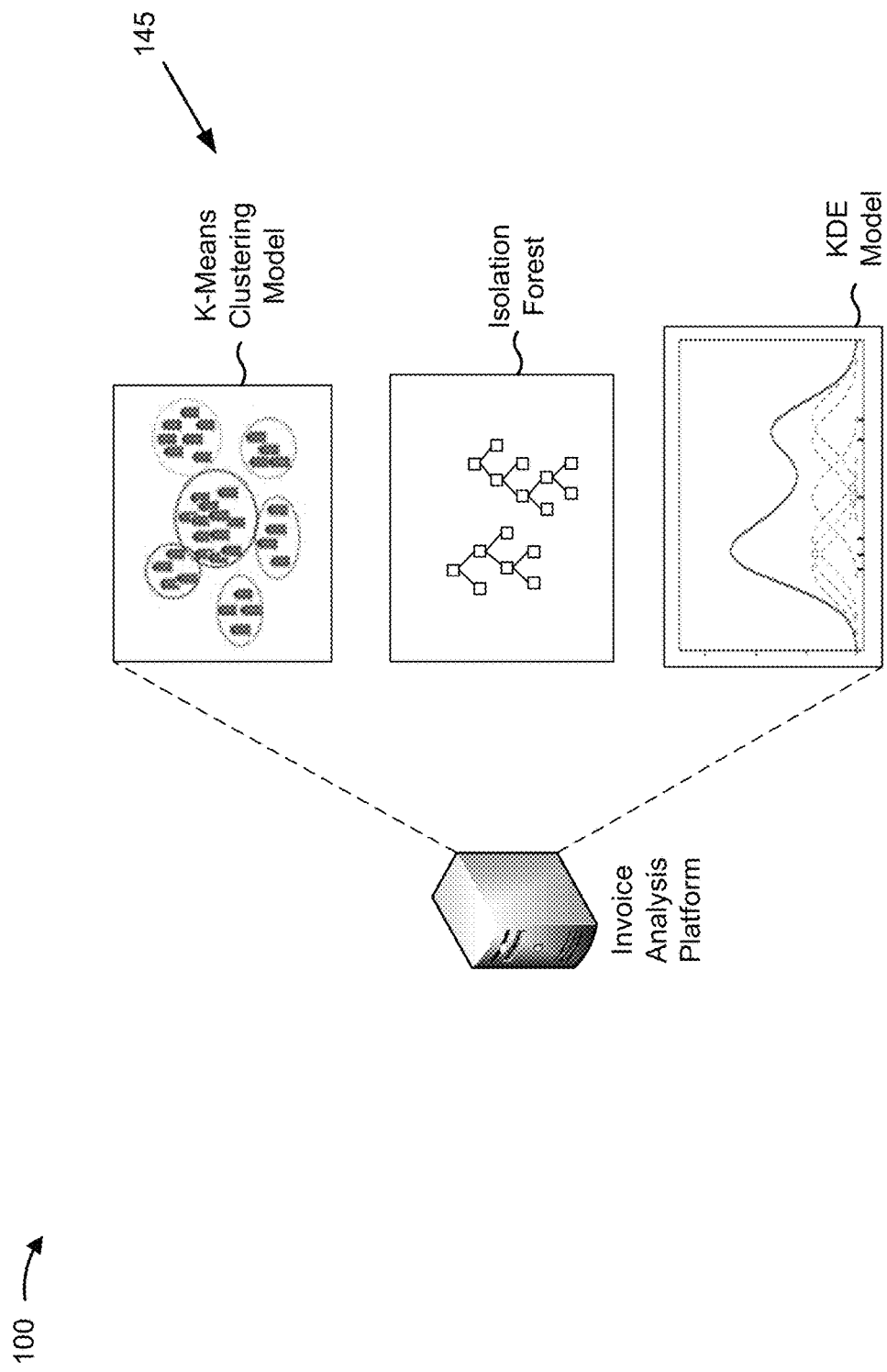

Turning to FIG. 1F, and as shown by reference number 145, the set of unsupervised learning models may include various types of models. For example, the set of unsupervised learning models may include a k-means clustering model where invoice data is partitioned into clusters with a nearest mean. Additionally, or alternatively, and as another example, the set of unsupervised learning models may include an isolation forest where decision trees of the isolation forest are generated from the invoice. Additionally, or alternatively, and as another example, the set of unsupervised learning models may include a kernel density estimation (KDE) model. For example, the KDE model may use a kernel parameter and a kernel bandwidth parameter to process data related to an invoice to make a prediction related to the invoice. In this way, the set of unsupervised learning models may be trained to measure similarities between data related to the historical invoices and data related to the invoice and/or to measure similarities between customers behaviors.

Figure 1G:
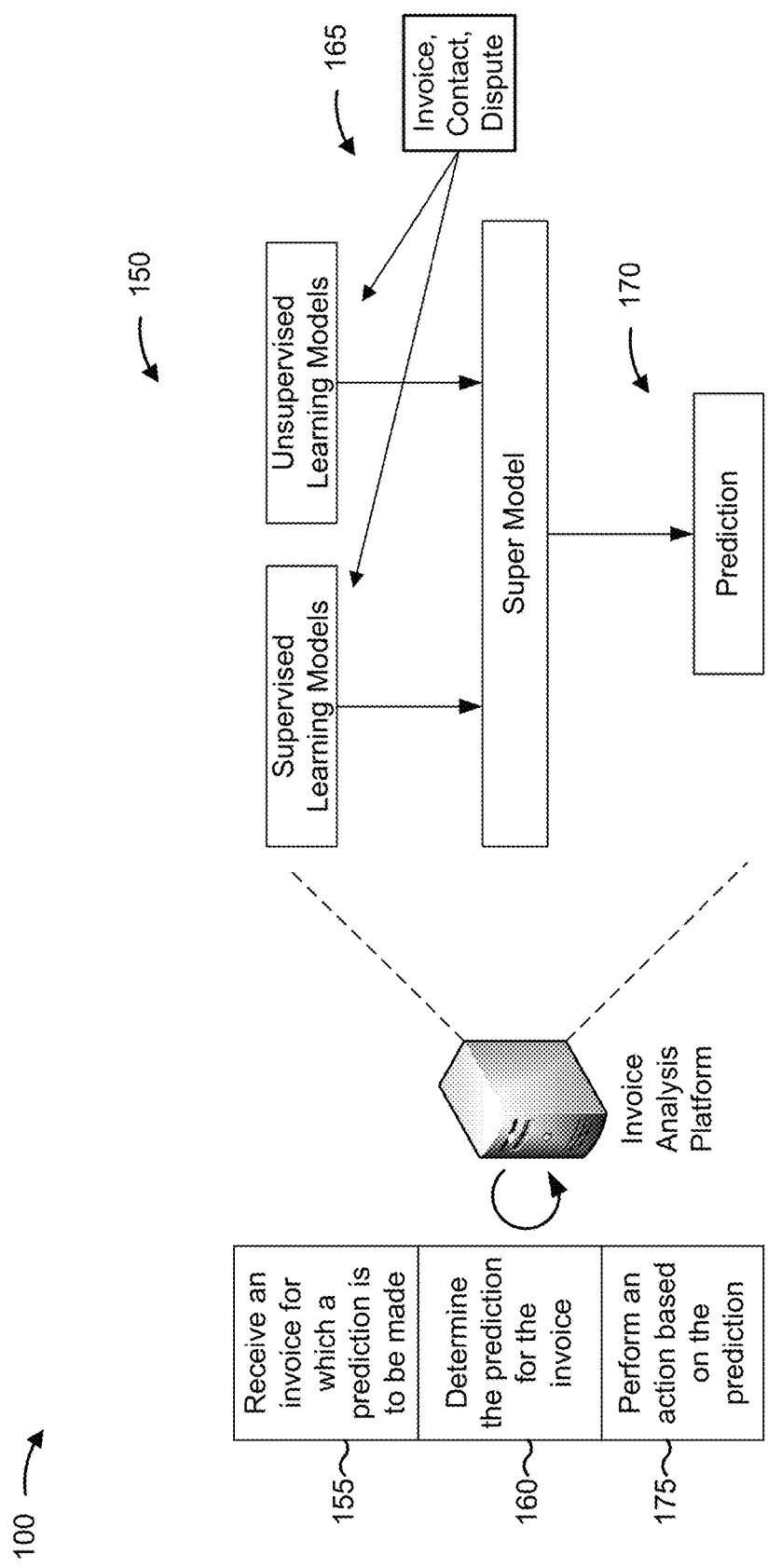

Turning to FIG. 1G, and as shown by reference number 150, the invoice analysis platform may combine the set of supervised learning models and the set of unsupervised learning models into a super model. For example, the invoice analysis platform may combine the set of supervised learning models and the set of unsupervised learning models into the super model after determining the set of supervised learning models and the set of unsupervised learning models. In some implementations, the invoice analysis platform may generate the super model by combining various trained models into a single model. In some implementations, the super model may include a machine learning model similar to that described elsewhere herein. In some implementations, and as described elsewhere herein, output from the super model may include a prediction for an invoice, a score that indicates a likelihood that an invoice will be associated with an issue, a score that indicates a confidence level associated with a prediction, and/or the like.

In some implementations, the super model may include a random forest model. For example, the invoice analysis platform may combine the set of supervised learning models and the set of unsupervised learning models into a random forest model that can be used to determine a prediction for an invoice (e.g., by constructing multiple decision trees from the set of supervised learning models and the set of unsupervised learning models). Additionally, or alternatively, the super model may include a neural network. For example, the set of supervised learning models and the set of unsupervised learning models may be combined into a neural network that can be used to determine a prediction for an invoice (e.g., where nodes of the neural network are trained to process data related to an invoice in a manner similar to the set of unsupervised learning models and/or the set of supervised learning models).

As shown by reference number 155, the invoice analysis platform may receive an invoice for which a prediction is to be made. For example, the invoice analysis platform may receive the invoice after generating the super model. In some implementations, the invoice may include data that identifies a set of entities associated with the invoice, an amount associated with the invoice, a due date associated with the invoice, a location associated with the invoice, a type of goods and/or services associated with the invoice, and/or the like. In some implementations, the invoice may be similar to a historical invoice described elsewhere herein.

In some implementations, the invoice analysis platform may receive the invoice from the server device, the client device, the user device, and/or the like. In some implementations, the invoice analysis platform may receive the invoice when the invoice is generated (e.g., in real-time or near real-time), may receive a batch of invoices at a particular time or after a threshold quantity of invoices have been generated, and/or the like. In some implementations, the invoice analysis platform may receive thousands, millions, or more invoices associated with thousands, millions, or more entities, locations, and/or the like. In this way, the invoice analysis platform may receive a quantity of invoices that cannot be processed manually or objectively (e.g., in a consistent manner) by a human actor.

As shown by reference number 160, the invoice analysis platform may determine the prediction for the invoice. For example, the invoice analysis platform may determine the prediction for the invoice after receiving the invoice. In some implementations, the invoice analysis platform may determine the prediction by processing invoice-related data (e.g., data included in the invoice). For example, the invoice analysis platform may process data identifying entities associated with the invoice, an amount of a payment associated with the invoice, a location of the entities, goods, and/or services associated with the invoice, and/or the like using the set of supervised learning models, the set of unsupervised learning models, and/or the super model to determine a prediction for the invoice. In some implementations, a prediction may include a prediction of the invoice being associated with a type of issue, such as a late payment associated with the invoice, a late payment after a particular time, an amount of time for the late payment, whether the invoice is likely to be disputed, types of contacts that will be needed and/or that will be successful in collecting any late payments associated with the invoice (e.g., an email, a text, a telephone call, an in-person visit from a collection agent and/or the like), and/or the like.

In some implementations, the invoice analysis platform may determine a score for the invoice and may determine a prediction for the invoice based on the score. For example, the invoice analysis platform may determine the score after receiving the invoice by processing invoice-related data using the set of supervised learning models, the set of unsupervised learning models, and/or the super model. In some implementations, the score may indicate a likelihood of the invoice including a type of issue. For example, the score may indicate a likelihood of the invoice including a type of issue similar to that described above. In some implementations, a score that satisfies a threshold may indicate a particular type of issue, and the invoice analysis platform may determine a prediction based on the score satisfying the threshold. Additionally, or alternatively, the invoice analysis platform may determine different scores for different types of issues, and may determine a set of predictions for the different types of issues based on the different scores. Additionally, or alternatively, the invoice analysis platform may determine a score that indicates a confidence level of a prediction. For example, a score output from the super model may indicate a confidence level of a prediction based on a similarity between attributes associated with the invoice and attributes of one or more historical invoices.

In some implementations, the invoice analysis platform may supplement data from an invoice with data related to entities associated with the invoice, such as demographic data. In some implementations, the invoice analysis platform may determine a prediction, a score, and/or the like based on the data related to the entities, thereby accounting for variations in characteristics of entities.

As shown by reference number 165, the invoice analysis platform may input the invoice (or data extracted from the invoice using a text processing technique, an image processing technique, and/or the like similar to that described elsewhere herein) into the set of supervised learning models and/or the set of unsupervised learning models. In addition, the invoice analysis platform may input other data in association with inputting the invoice, such as data associated with entities associated with the invoice, data related to a contact between entities, data related to a dispute between entities, and/or the like.

In some implementations, the set of supervised learning models may identify patterns in the data extracted from the invoice or other data in a context of the historical invoices, the historical patterns, the historical contacts, and/or the historical disputes. In some implementations, output from the set of supervised learning models may include a score that indicates a similarity of the invoice to a historical invoice, a likelihood of the invoice being associated with a dispute similar to a historical dispute, a likelihood of the invoice needing a contact similar to a historical contact, a likelihood of a type of issue occurring for the invoice, a similarity of a contact to a historical contact, a similarity of a dispute to a historical dispute, and/or the like. Additionally, or alternatively, the output may identify an accuracy of historical patterns related to the historical invoice, the historical dispute, the historical contact, historical issues, and/or the like.

In some implementations, the set of unsupervised learning models may identify patterns in the extracted data independent of a context of the historical invoices, the historical contacts, the historical disputes, and/or the historical patterns. For example, the set of unsupervised learning models may identify particular and/or abnormal patterns in the extracted data, and may output information that identifies the particular and/or abnormal patterns. In some implementations, the output from the set of unsupervised learning models may include a score that identifies whether the patterns of data match that for the same entity, the same goods and/or services, and/or the like.

In some implementations, the invoice analysis platform may process output from the set of supervised learning models and/or the set of unsupervised learning models using the super model. For example, the invoice analysis platform may input scores, patterns of data, invoice-related data, contact-related data, dispute-related data, and/or the like into the super model in association with determining the prediction for the invoice. In some implementations, the invoice analysis platform may use the super model to determine the prediction, a score, and/or the like. Continuing with the previous example, the invoice analysis platform may determine whether a combination of location, amount, entity, and/or the like associated with the invoice, the contact, and/or the dispute matches a pattern of historical invoices, historical contacts, historical disputes, historical patterns, and/or the like on which the set of supervised learning models and/or the set of unsupervised learning models were trained.

Additionally, or alternatively, the super model may analyze scores from the set of supervised learning models and/or the set of unsupervised learning models to determine a total score for the invoice. For example, the total score may be a contextualization of scores from the set of supervised learning models with scores from the set of unsupervised learning models, such as to adjust scores from the set of supervised learning models based on unique patterns of data for the invoice, the contact, and/or the dispute, to contextualize scores related to the unique patterns of data of the invoice to historical invoices, historical contacts, historical disputes, and/or the like. In this way, the super model may utilize output from both the set of supervised learning models and the set of unsupervised learning models to determine a prediction.

In some implementations, the super model may output a prediction based on the total score satisfying a threshold. Additionally, or alternatively, the super model may output a score and the invoice analysis platform may determine the prediction based on the score. For example, the super model may output different scores for different types of issues occurring (e.g., that indicate likelihoods of the different types of issues occurring), for different contacts (e.g., that indicate likelihoods of the different types of contacts being successful in collecting an underpayment), that indicate a likelihood of the invoice being paid on-time or by a particular time, and/or the like, and the invoice analysis platform may determine various predictions based on these different scores.

As shown by reference number 170, the super model may output the prediction (or a score) after the invoice analysis platform has processed the invoice-related data using the super model. In some implementations, the prediction may be associated with an indication of a likelihood of the prediction occurring, a confidence level associated with the prediction, and/or the like. In some implementations, the prediction may be associated with a score (e.g., that indicates the likelihood of the prediction occurring, the confidence level of the prediction occurring, and/or the like). For example, the score may be an average score, a range of scores, and/or the like. Continuing with the previous example, the invoice analysis platform may perform multiple iterations of processing the invoice-related data and may generate the score based on the scores associated with the multiple iterations.

As shown by reference number 175, the invoice analysis platform may perform an action based on the prediction (or a score associated with the prediction). For example, the invoice analysis platform may perform an action after determining the prediction for the invoice. In some implementations, the invoice analysis platform may trigger an alarm based on the prediction (e.g., based on a type of issue associated with the prediction). Additionally, or alternatively, the invoice analysis platform may send a message to the client device, the user device, and/or the server device (e.g., that includes information that identifies the invoice, the prediction, and/or the like). Additionally, or alternatively, the invoice analysis platform may generate a report that identifies the prediction (e.g., that includes information that identifies the prediction, a likelihood of the prediction occurring, and/or the like), and may store the report in the server device and/or may output the report via the client device and/or the user device (e.g., via a display).

In some implementations, the invoice analysis platform may determine a priority for the invoice. For example, the invoice analysis platform may determine a priority for the invoice relative to one or more other invoices. Continuing with the previous example, the invoice analysis platform may determine the priority based on a severity of a type of issue associated with the invoice relative to other types of issues associated with the one or more other invoices, based on a likelihood of a prediction associated with the invoice relative to other likelihoods of other predictions associated with the one or more other invoices, and/or the like. In some implementations, the invoice analysis platform may generate a collection plan for the invoice based on a priority for the invoice, a type of issue predicted to occur with respect to the invoice, and/or the like. For example, the invoice analysis platform may generate a collection plan that identifies types of actions to be performed with respect to collecting payment on an invoice, times at which to perform the set of actions, an order in which to perform the set of actions, and/or the like. Continuing with the previous example, the set of actions may include sending a message to another device associated with an entity associated with the invoice, placing a robotic telephone call to a telephone associated with the entity, populating an electronic queue associated with a collection agent with information related to the invoice, dispatching the collection agent to a location associated with the entity, and/or the like.

In some implementations, the invoice analysis platform may determine that an invoice is outstanding at a particular time, such as a due date for a payment associated with the invoice. For example, the invoice analysis platform may store information that identifies the due date in a data structure and may determine that the invoice is outstanding when the due date elapses without receiving an indication that the payment was received. In some implementations, the invoice analysis platform may perform the set of actions at the times the invoice analysis platform determined to perform the actions after determining that an invoice is outstanding at the particular time.

Additionally, or alternatively, the invoice analysis platform may update one or more of the models described herein (e.g., using updated invoice data, contact data, dispute data, and/or the like). Additionally, or alternatively, the invoice analysis platform may trigger an automated investigation of an invoice (e.g., may trigger a more rigorous analysis of the invoice, such as by requesting input of an explanation of an underpayment of the invoice). For example, the invoice analysis platform may send a message to a server device associated with performing the automated investigation to cause the server device to perform the automated investigation (e.g., the message may identify an invoice, an entity, and/or the like to be investigated). Additionally, or alternatively, the invoice analysis platform may trigger a manual investigation of the invoice (e.g., by sending a message to a user device associated with an investigator). For example, the message may include information that identifies an invoice, an entity, and/or the like to be investigated. Continuing with the previous example, the invoice analysis platform may provide the message to an electronic account associated with an investigator, for display, and/or the like.

Additionally, or alternatively, the invoice analysis platform may freeze an account associated with an entity until an underpayment is remedied. For example, the invoice analysis platform may send a message to a server device to block access to an account by an individual, to block actions on an account, and/or the like. Additionally, or alternatively, the invoice analysis platform may remove, add, or modify a requirement to an order approval process, such as a requirement related to an individual that needs to authorize provisioning of goods and/or services to an entity with a history of underpaying invoices, a timing of that authorization (e.g., before or after an order), what needs to be pre-authorized, and/or the like. For example, the invoice analysis platform may send a message to a server device to configure a setting, related to a requirement of an order approval process, for an entity, a particular good and/or service, and/or the like.

Additionally, or alternatively, the invoice analysis platform may flag the invoice based on the prediction. For example, the invoice analysis platform may flag the invoice as being predicted to be associated with a type of issue and/or for further review based on the prediction by configuring a flag, such as a particular value, in an electronic record associated with the invoice (e.g., the flag may be displayed with a corresponding invoice when the invoice is provided for display, may cause a device to perform actions based on the flag, and/or the like). Additionally, or alternatively, the invoice analysis platform may flag attributes associated with the invoice. For example, the invoice analysis platform may flag an entity, a location, and/or the like associated with the invoice. In some implementations, the invoice analysis platform may store, in a data structure, information that identifies the invoice, whether the invoice is predicted to be associated with a type of issue (or to not be associated with the type of issue), and/or the like.

In this way, the invoice analysis platform provides a tool for analyzing hundreds, thousands, or more invoices in real-time or near real-time for prediction of issues that may occur in association with the invoices, for optimization of use of resources for collection of underpayments associated with the invoices, and/or the like. This reduces an amount of time and/or resources of an organization that need to be used to collect underpayments for the invoices, thereby improving an efficiency of collecting the underpayments. In addition, utilizing the invoice analysis platform in this manner offloads tasks related to analyzing the invoices from conventional computing resources, thereby minimizing a computing load on the conventional computing resources, minimizing crashes and/or freezes of the computing resources attributable to analyzing the invoices, and/or the like. Further, utilizing the invoice analysis platform in this manner provides a way to analyze the invoices in a manner not previously possible, thereby facilitating new insight into the invoices.

As indicated above, FIGS. 1A-1G are provided merely as an example. Other examples are possible and may differ from what was described with regard to FIGS. 1A-1G. Although implementation 100 was described in the context of processing invoices, the implementations apply equally to bills, dues payments, subscriptions, and/or the like. Although some implementations are described as using various models for classification of data, some implementations may use the various models for regression-type analyses.

Figure 2:
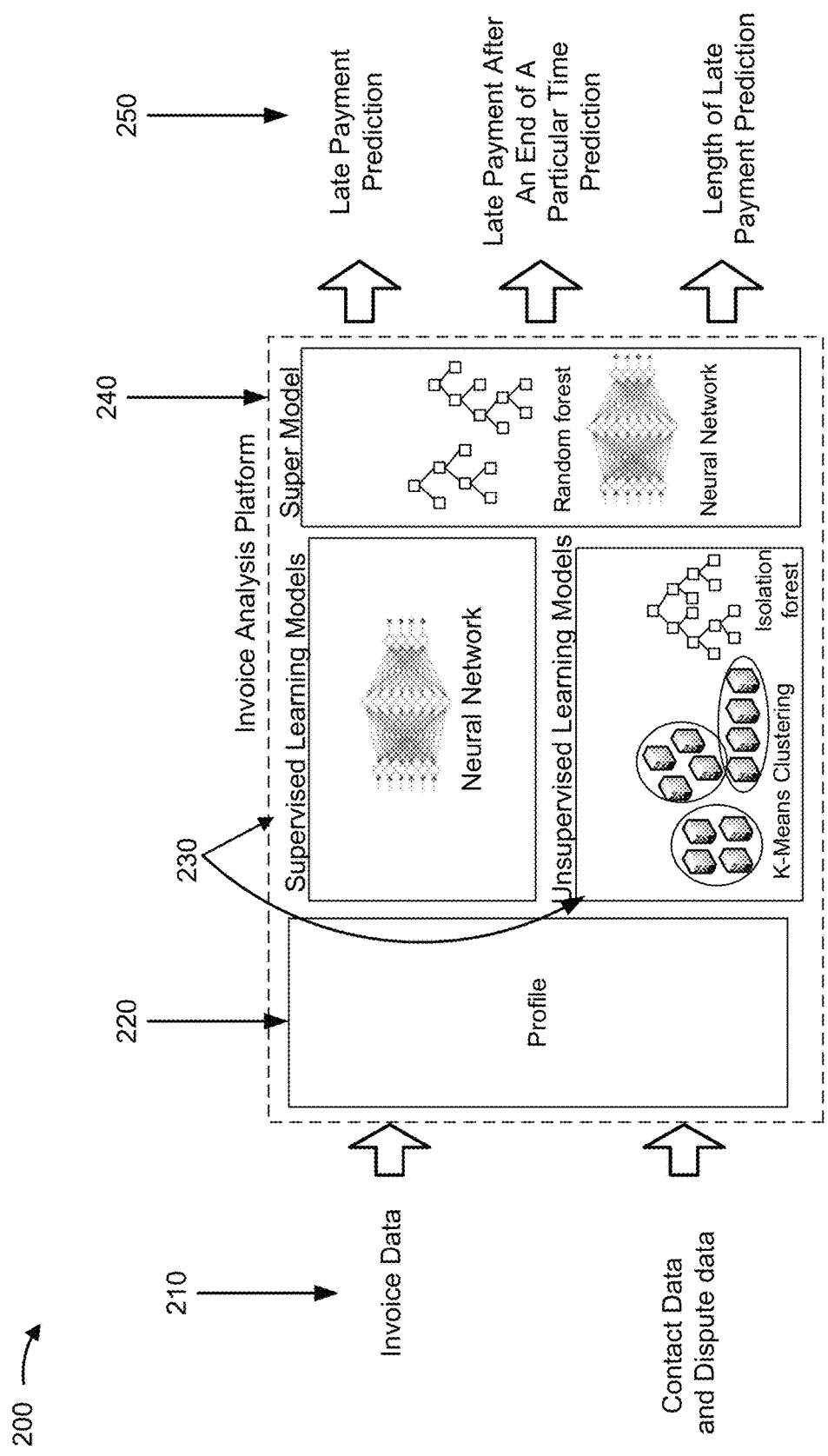
FIGS. 2-3 are diagrams of example implementations related to predictive issue detection.

FIG. 2 is a diagram of an example implementation 200 related to predictive issue detection. As shown by reference number 210, an invoice analysis platform may receive invoice data, contact data, and/or dispute data in a manner that is the same as or similar to that described elsewhere herein. For example, the invoice analysis platform may receive the invoice data, the contact data, and/or the dispute data from a client device, a server device, a user device, and/or the like. As shown by reference number 220, the invoice analysis platform may determine a profile for the invoice data, the contact data, and/or the dispute data in a manner that is the same as or similar to that described elsewhere herein. For example, the invoice analysis platform may determine a profile for the invoice data, the contact data, and/or the dispute data by entity, by invoice, by location, and/or the like.

As shown by reference number 230, the invoice analysis platform may determine a set of supervised learning models and/or a set of unsupervised learning models in a manner that is the same as or similar to that described elsewhere herein. For example, the invoice analysis platform may determine a neural network, a linear regression model (not shown), an ensemble-based model (not shown), and/or the like as the set of supervised learning models. Additionally, or alternatively, and as another example, the invoice analysis platform may determine a k-means clustering model, an isolation forest, and/or the like as the set of unsupervised learning models. As shown by reference number 240, the invoice analysis platform may combine the set of supervised learning models and the set of unsupervised learning models into a super model in a manner that is the same as or similar to that described elsewhere herein. For example, the invoice analysis platform may combine the set of supervised learning models and the set of unsupervised learning models into a random forest model, a neural network, and/or the like.

As shown by reference number 250 the super model may be associated with making various predictions for an invoice. For example, the super model may be associated with predicting a late payment for the invoice (shown as "Late Payment Prediction"), a late payment after an end of a particular time (shown as "Late Payment After An End of A Particular Time Prediction"), such as an end of a month, a length of a late payment (shown as "Length of Late Payment Prediction"), such as a quantity of days a payment is expected to be outstanding, and/or the like.

As indicated above, FIG. 2 is provided merely as an example. Other examples are possible and may differ from what was described with regard to FIG. 2.

Figure 3:
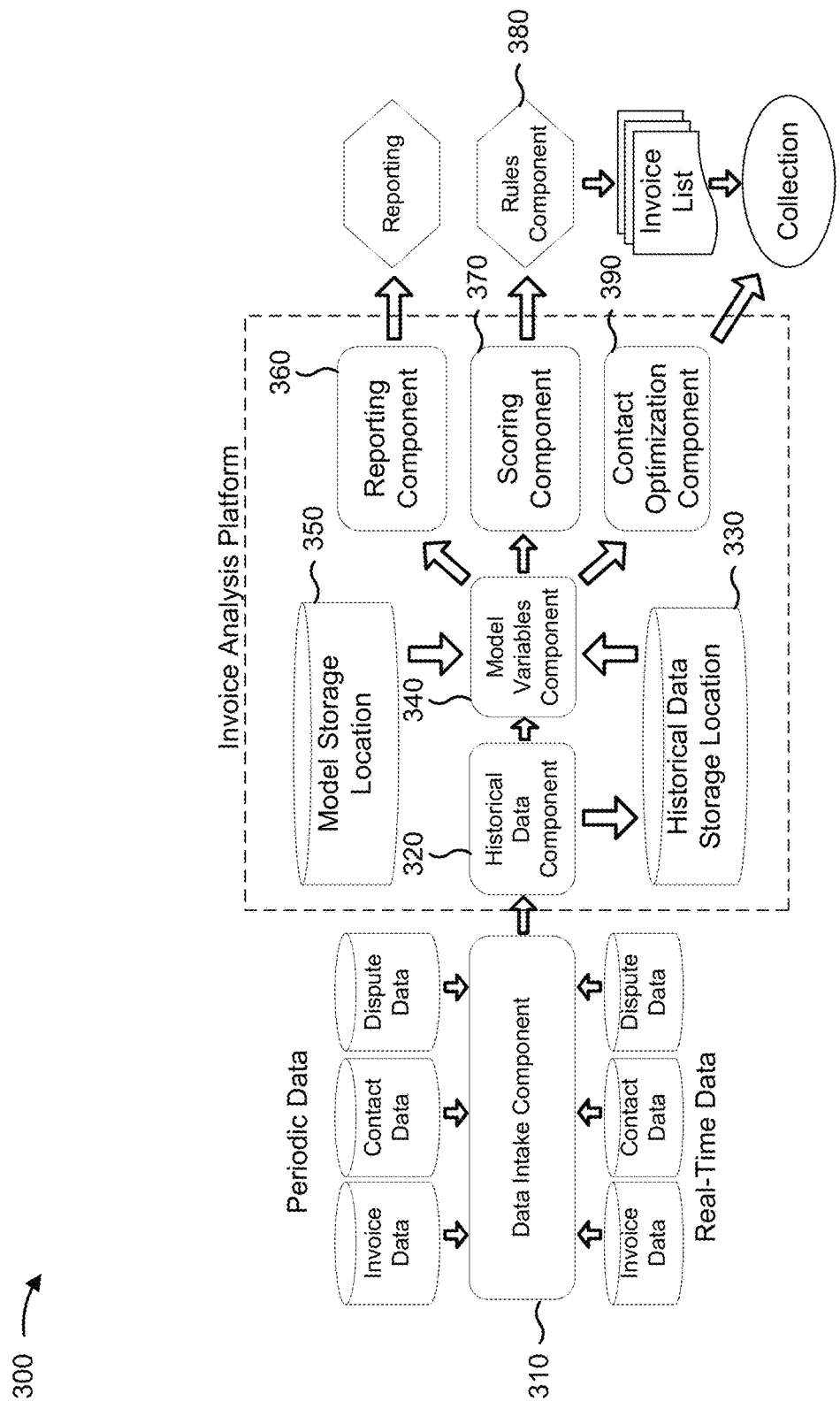

FIG. 3 is a diagram of an example implementation 300 related to predictive issue detection.

As shown by reference number 310, a data intake component may be associated with an invoice analysis platform. In some implementations, the data intake component may receive and/or process invoice data, contact data, dispute data, and/or the like in a manner that is the same as or similar to that described elsewhere herein. In some implementations, the data intake component may receive and/or process periodic data (e.g., data that is updated on a daily, weekly, and/or monthly basis), real-time (or near real-time) data, and/or the like. As shown by reference number 320, the invoice analysis platform may include a historical data component. In some implementations, the historical data component may populate a historical data storage location (shown by reference number 330) with invoice data related to historical invoices, contact data related to historical contacts, dispute data related to historical disputes, data related to historical patterns, and/or the like.

As shown by reference number 340, the invoice analysis platform may include a model variables component. In some implementations, the invoice analysis platform may process the data from the historical data storage location to identify features and/or patterns of the data. For example, the model variables component may generate the set of supervised learning models and/or the set of unsupervised learning models from the data stored in the historical data storage location in a manner that is the same as or similar to that described elsewhere herein. In some implementations, the model variables component may store the generated set of supervised learning models and/or the generated set of unsupervised learning models in a model storage location (shown by reference number 350). In some implementations, when the invoice analysis platform receives invoice-related data for an invoice for which the invoice analysis platform is to make a prediction, the invoice analysis platform may use the model variables component to process the invoice-related data in a manner that is the same as or similar to that described elsewhere herein.

As shown by reference number 360, the invoice analysis platform may include a reporting component. For example, the reporting component may generate output that identifies a prediction for an invoice in a manner that is the same as or similar to that described elsewhere herein. As shown by reference number 370, the invoice analysis platform may include a scoring component. For example, the scoring component may determine a score that indicates a likelihood of a prediction occurring for an invoice. In some implementations, the scoring component may output a score to a rules component (shown by reference number 380). In some implementations, the rules component may generate an invoice list based on scores for various invoices based on prioritizing the various invoices. For example, the invoice list may identify invoices prioritized for collection of unpaid amounts, for generation of collection plans, and/or the like.

As shown by reference number 390, the invoice analysis platform may include a contact optimization component. For example, the contact optimization component may generate a collection plan for collection of an unpaid amount associated with an invoice included in the invoice list, may perform a set of actions associated with the collection plan, and/or the like.

As indicated above, FIG. 3 is provided merely as an example. Other examples are possible and may differ from what was described with regard to FIG. 3.

Figure 4:
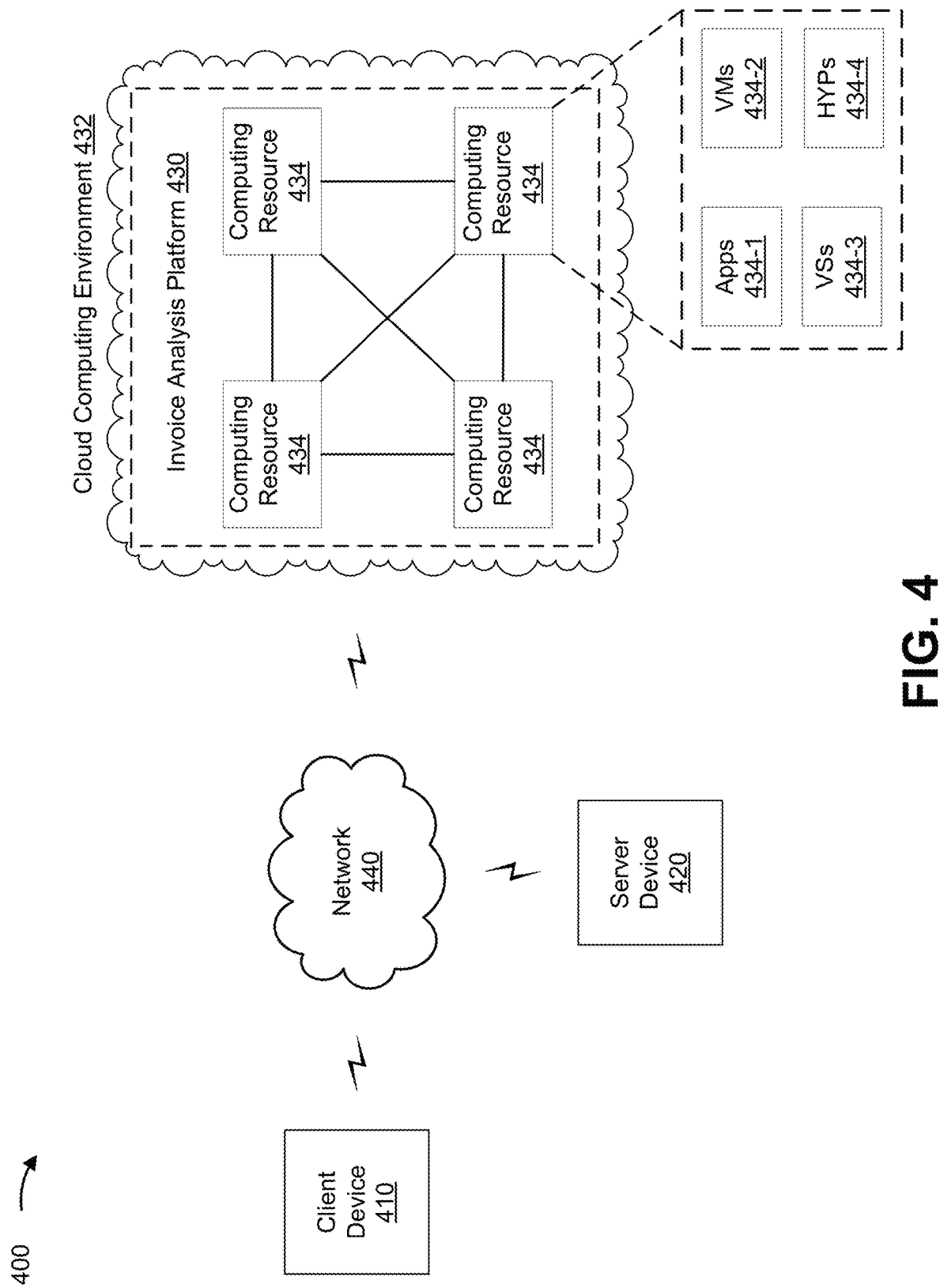
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include a client device 410, a server device 420, an invoice analysis platform 430 hosted within a cloud computing environment 432 that includes a set of computing resources 434, and a network 440. Devices of environment 400 may interconnect via wired connections, wireless connections, or a combination of wired and wireless connections.

Client device 410 includes one or more devices capable of receiving, generating, storing, processing, and/or providing information associated with an invoice. For example, client device 410 may include a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a desktop computer, or a similar type of device. In some implementations, client device 410 may provide, to invoice analysis platform 430, an invoice for which a prediction is to be made by invoice analysis platform 430, as described elsewhere herein. In some implementations, a user device, as described elsewhere herein, may be the same as or similar to client device 410.

Server device 420 includes one or more devices capable of receiving, generating storing, processing, and/or providing information associated with an invoice. For example, server device 420 may include a server (e.g., in a data center or a cloud computing environment), a data center (e.g., a multi-server micro datacenter), a workstation computer, a virtual machine (VM) provided in a cloud computing environment, or a similar type of device. In some implementations, server device 420 may include a communication interface that allows server device 420 to receive information from and/or transmit information to other devices in environment 400. In some implementations, server device 420 may be a physical device implemented within a housing, such as a chassis. In some implementations, server device 420 may be a virtual device implemented by one or more computer devices of a cloud computing environment or a data center. In some implementations, server device 420 may provide, to invoice analysis platform 430, an invoice for which a prediction is to be made by invoice analysis platform 430, as described elsewhere herein.

Invoice analysis platform 430 includes one or more devices capable of receiving, generating, storing, processing, and/or providing information related to invoices. For example, invoice analysis platform 430 may include a cloud server or a group of cloud servers. In some implementations, invoice analysis platform 430 may be designed to be modular such that certain software components can be swapped in or out depending on a particular need. As such, invoice analysis platform 430 may be easily and/or quickly reconfigured for different uses.

In some implementations, as shown in FIG. 4, invoice analysis platform 430 may be hosted in cloud computing environment 432. Notably, while implementations described herein describe invoice analysis platform 430 as being hosted in cloud computing environment 432, in some implementations, invoice analysis platform 430 may be non-cloud-based (i.e., may be implemented outside of a cloud computing environment) or may be partially cloud-based.

Cloud computing environment 432 includes an environment that hosts invoice analysis platform 430. Cloud computing environment 432 may provide computation, software, data access, storage, and/or other services that do not require end-user knowledge of a physical location and configuration of a system and/or a device that hosts invoice analysis platform 430. As shown, cloud computing environment 432 may include a group of computing resources 434 (referred to collectively as "computing resources 434" and individually as "computing resource 434").

Computing resource 434 includes one or more personal computers, workstation computers, server devices, or another type of computation and/or communication device. In some implementations, computing resource 434 may host invoice analysis platform 430. The cloud resources may include compute instances executing in computing resource 434, storage devices provided in computing resource 434, data transfer devices provided by computing resource 434, etc. In some implementations, computing resource 434 may communicate with other computing resources 434 via wired connections, wireless connections, or a combination of wired and wireless connections.

As further shown in FIG. 4, computing resource 434 may include a group of cloud resources, such as one or more applications ("APPs") 434-1, one or more virtual machines ("VMs") 434-2, one or more virtualized storages ("VSs") 434-3, or one or more hypervisors ("HYPs") 434-4.

Application 434-1 includes one or more software applications that may be provided to or accessed by one or more devices of environment 400. Application 434-1 may eliminate a need to install and execute the software applications on devices of environment 400. For example, application 434-1 may include software associated with invoice analysis platform 430 and/or any other software capable of being provided via cloud computing environment 432. In some implementations, one application 434-1 may send/receive information to/from one or more other applications 434-1, via virtual machine 434-2. In some implementations, application 434-1 may include a software application associated with one or more databases and/or operating systems. For example, application 434-1 may include an enterprise application, a functional application, an analytics application, and/or the like.

Virtual machine 434-2 includes a software implementation of a machine (e.g., a computer) that executes programs like a physical machine. Virtual machine 434-2 may be either a system virtual machine or a process virtual machine, depending upon use and degree of correspondence to any real machine by virtual machine 434-2. A system virtual machine may provide a complete system platform that supports execution of a complete operating system ("OS"). A process virtual machine may execute a single program, and may support a single process. In some implementations, virtual machine 434-2 may execute on behalf of a user (e.g., a user of client device 410), and may manage infrastructure of cloud computing environment 432, such as data management, synchronization, or long-duration data transfers.

Virtualized storage 434-3 includes one or more storage systems and/or one or more devices that use virtualization techniques within the storage systems or devices of computing resource 434. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 434-4 provides hardware virtualization techniques that allow multiple operating systems (e.g., "guest operating systems") to execute concurrently on a host computer, such as computing resource 434. Hypervisor 434-4 may present a virtual operating platform to the guest operating systems, and may manage the execution of the guest operating systems. Multiple instances of a variety of operating systems may share virtualized hardware resources.

Network 440 includes one or more wired and/or wireless networks. For example, network 440 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
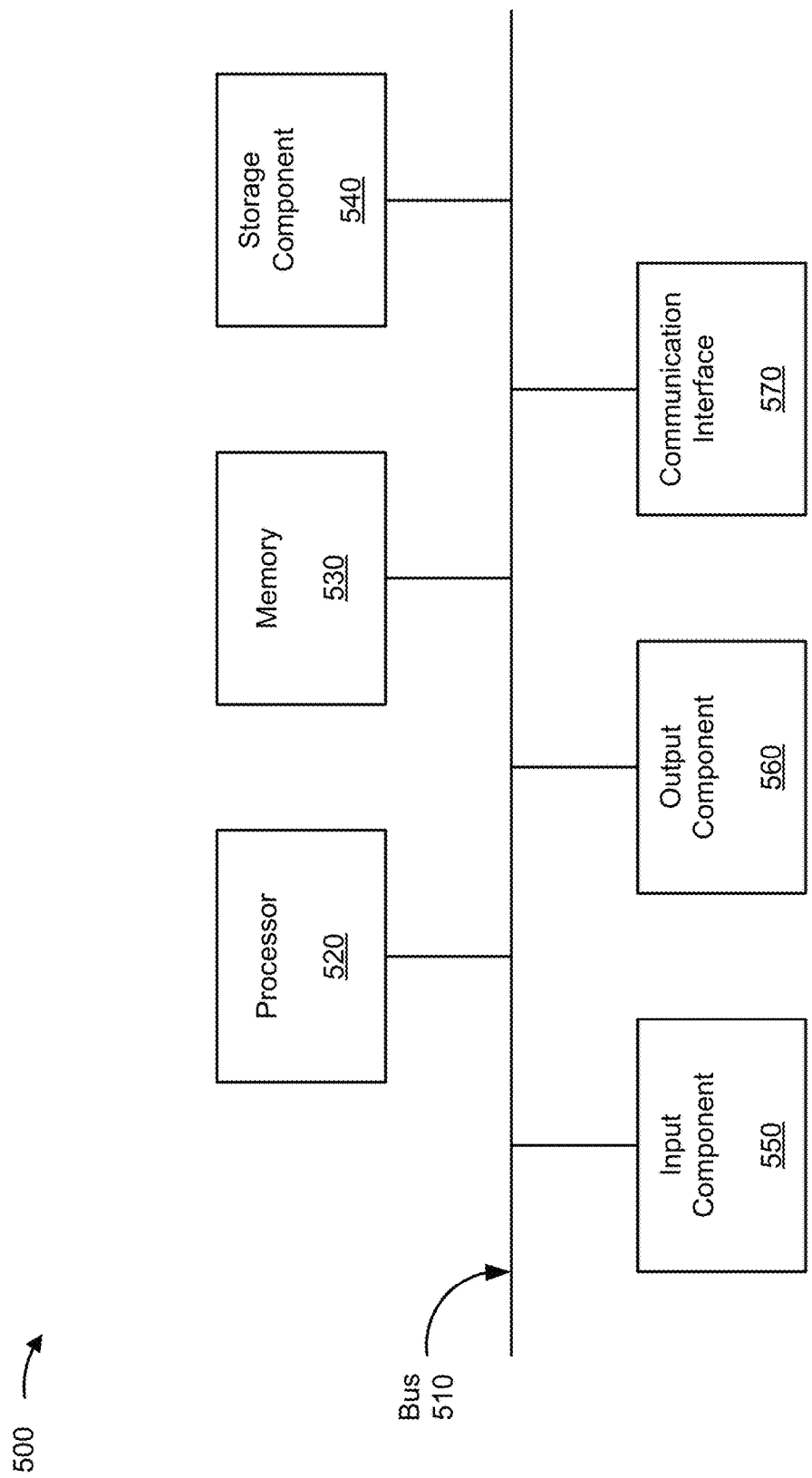
FIG. 5 is a diagram of example components of one or more devices of FIG. 2.

FIG. 5 is a diagram of example components of a device 500. Device 500 may correspond to client device 410, server device 420, invoice analysis platform 430, and/or computing resource 434. In some implementations, client device 410, server device 420, invoice analysis platform 430, and/or computing resource 434 may include one or more devices 500 and/or one or more components of device 500. As shown in FIG. 5, device 500 may include a bus 510, a processor 520, a memory 530, a storage component 540, an input component 550, an output component 560, and a communication interface 570.

Bus 510 includes a component that permits communication among the components of device 500. Processor 520 is implemented in hardware, firmware, or a combination of hardware and software. Processor 520 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 520 includes one or more processors capable of being programmed to perform a function. Memory 530 includes a random access memory (RAM), a read only memory (ROM), and/or another type of dynamic or static storage device (e.g., a flash memory, a magnetic memory, and/or an optical memory) that stores information and/or instructions for use by processor 520.

Storage component 540 stores information and/or software related to the operation and use of device 500. For example, storage component 540 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 550 includes a component that permits device 500 to receive information, such as via user input (e.g., a touch screen display, a keyboard, a keypad, a mouse, a button, a switch, and/or a microphone). Additionally, or alternatively, input component 550 may include a sensor for sensing information (e.g., a global positioning system (GPS) component, an accelerometer, a gyroscope, and/or an actuator). Output component 560 includes a component that provides output information from device 500 (e.g., a display, a speaker, and/or one or more light-emitting diodes (LEDs)).

Communication interface 570 includes a transceiver-like component (e.g., a transceiver and/or a separate receiver and transmitter) that enables device 500 to communicate with other devices, such as via a wired connection, a wireless connection, or a combination of wired and wireless connections. Communication interface 570 may permit device 500 to receive information from another device and/or provide information to another device. For example, communication interface 570 may include an Ethernet interface, an optical interface, a coaxial interface, an infrared interface, a radio frequency (RF) interface, a universal serial bus (USB) interface, a Wi-Fi interface, a cellular network interface, or the like.

Device 500 may perform one or more processes described herein. Device 500 may perform these processes based on to processor 520 executing software instructions stored by a non-transitory computer-readable medium, such as memory 530 and/or storage component 540. A computer-readable medium is defined herein as a non-transitory memory device. A memory device includes memory space within a single physical storage device or memory space spread across multiple physical storage devices.

Software instructions may be read into memory 530 and/or storage component 540 from another computer-readable medium or from another device via communication interface 570. When executed, software instructions stored in memory 530 and/or storage component 540 may cause processor 520 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
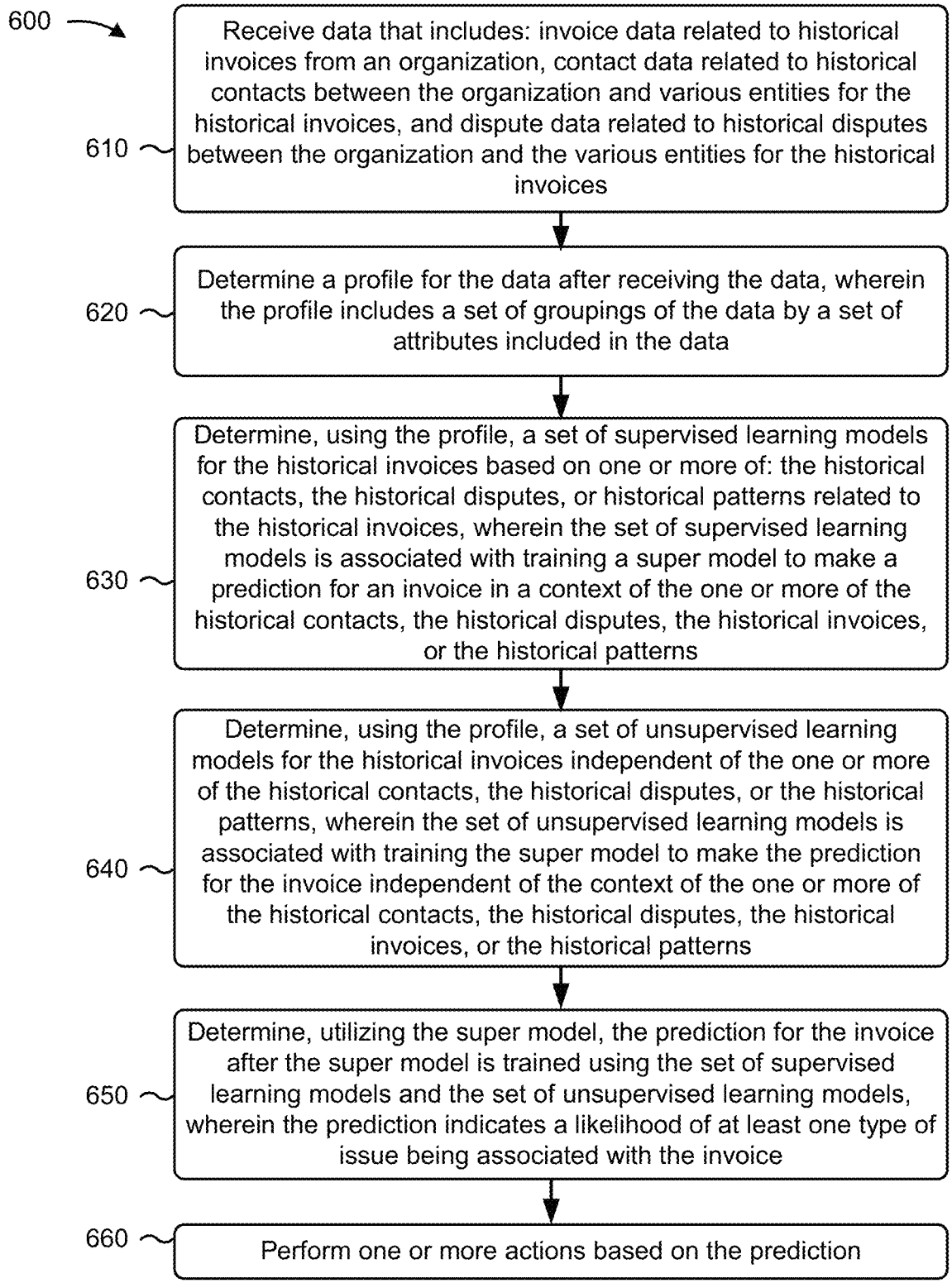
FIGS. 6-8 are flow charts of example processes for predictive issue detection.

FIG. 6 is a flow chart of an example process 600 for predictive issue detection. In some implementations, one or more process blocks of FIG. 6 may be performed by an invoice analysis platform (e.g., invoice analysis platform 430). In some implementations, one or more process blocks of FIG. 6 may be performed by another device or a group of devices separate from or including the invoice analysis platform, such as a client device (e.g., client device 410), a server device (e.g., server device 420), and a computing resource (e.g., computing resource 434).

As shown in FIG. 6, process 600 may include receiving data that includes: invoice data related to historical invoices from an organization, contact data related to historical contacts between the organization and various entities for the historical invoices, and dispute data related to historical disputes between the organization and the various entities for the historical invoices (block 610). For example, the invoice analysis platform (e.g., using computing resource 434, processor 520, input component 550, communication interface 570, and/or the like) may receive data that includes: invoice data related to historical invoices from an organization, contact data related to historical contacts between the organization and various entities for the historical invoices, and dispute data related to historical disputes between the organization and the various entities for the historical invoices, in a manner that is the same as or similar to that described elsewhere herein.

As further shown in FIG. 6, process 600 may include determining a profile for the data after receiving the data, wherein the profile includes a set of groupings of the data by a set of attributes included in the data (block 620). For example, the invoice analysis platform (e.g., using computing resource 434, processor 520, and/or the like) may determine a profile for the data after receiving the data, in a manner that is the same as or similar to that described elsewhere herein. In some implementations, the profile includes a set of groupings of the data by a set of attributes included in the data.

As further shown in FIG. 6, process 600 may include determining, using the profile, a set of supervised learning models for the historical invoices based on one or more of: the historical contacts, the historical disputes, or historical patterns related to the historical invoices, wherein the set of supervised learning models is associated with training a super model to make a prediction for an invoice in a context of the one or more of the historical contacts, the historical disputes, the historical invoices, or the historical patterns (block 630). For example, the invoice analysis platform (e.g., using computing resource 434, processor 520, and/or the like) may determine, using the profile, a set of supervised learning models for the historical invoices based on one or more of: the historical contacts, the historical disputes, or historical patterns related to the historical invoices, in a manner that is the same as or similar to that described elsewhere herein. In some implementations, the set of supervised learning models is associated with training a super model to make a prediction for an invoice in a context of the one or more of the historical contacts, the historical disputes, the historical invoices, or the historical patterns.

As further shown in FIG. 6, process 600 may include determining, using the profile, a set of unsupervised learning models for the historical invoices independent of the one or more of the historical contacts, the historical disputes, or the historical patterns, wherein the set of unsupervised learning models is associated with training the super model to make the prediction for the invoice independent of the context of the one or more of the historical contacts, the historical disputes, the historical invoices, or the historical patterns (block 640). For example, the invoice analysis platform (e.g., using computing resource 434, processor 520, and/or the like) may determine, using the profile, a set of unsupervised learning models for the historical invoices independent of the one or more of the historical contacts, the historical disputes, or the historical patterns, in a manner that is the same as or similar to that described elsewhere herein. In some implementations, the set of unsupervised learning models is associated with training the super model to make the prediction for the invoice independent of the context of the one or more of the historical contacts, the historical disputes, or the historical patterns.

As further shown in FIG. 6, process 600 may include determining, utilizing the super model, the prediction for the invoice after the super model is trained using the set of supervised learning models and the set of unsupervised learning models, wherein the prediction indicates a likelihood of at least one type of issue being associated with the invoice (block 650). For example, the invoice analysis platform (e.g., using computing resource 434, processor 520, and/or the like) may determine, utilizing the super model, the prediction for the invoice after the super model is trained using the set of supervised learning models and the set of unsupervised learning models, in a manner that is the same as or similar to that described elsewhere herein. In some implementations, the prediction indicates a likelihood of at least one type of issue being associated with the invoice.

As further shown in FIG. 6, process 600 may include performing one or more actions based on the prediction (block 660). For example, the invoice analysis platform (e.g., using processor 520, memory 530, storage component 540, output component 560, communication interface 570, and/or the like) may perform one or more actions based on the prediction, in a manner that is the same as or similar to that described elsewhere herein.

Process 600 may include additional implementations, such as any single implementation or any combination of implementations described herein and/or in connection with one or more other processes described herein.

In some implementations, the invoice analysis platform may determine the set of supervised learning models based on a set of models that includes: a linear regression model, an ensemble-based model, or a neural network. In some implementations, the invoice analysis platform may determine the set of unsupervised learning models based on a set of models that includes: a k-means clustering model, a kernel density estimation (KDE) model, or an isolation forest.

In some implementations, the invoice analysis platform may determine the profile based on respective geographic locations associated with the various entities or the historical invoices. In some implementations, the set of supervised learning models identifies accurately predicted historical invoices and inaccurately predicted historical invoices.

In some implementations, the set of unsupervised learning models identifies subsets of the historical invoices that correspond to particular patterns of the data. In some implementations, the invoice analysis platform may flag the invoice as being predicted to be associated with the at least one type of issue or to not be associated with the at least one type of issue based on the prediction; and storing, in a data structure, information that identifies the invoice and whether the invoice is predicted to be associated with the at least one type of issue or to not be associated with the at least one type of issue.

Although FIG. 6 shows example blocks of process 600, in some implementations process 600 may include additional blocks, fewer blocks, different blocks, or differently arranged blocks than those depicted in FIG. 6. Additionally, or alternatively, two or more of the blocks of process 600 may be performed in parallel.

Figure 7:
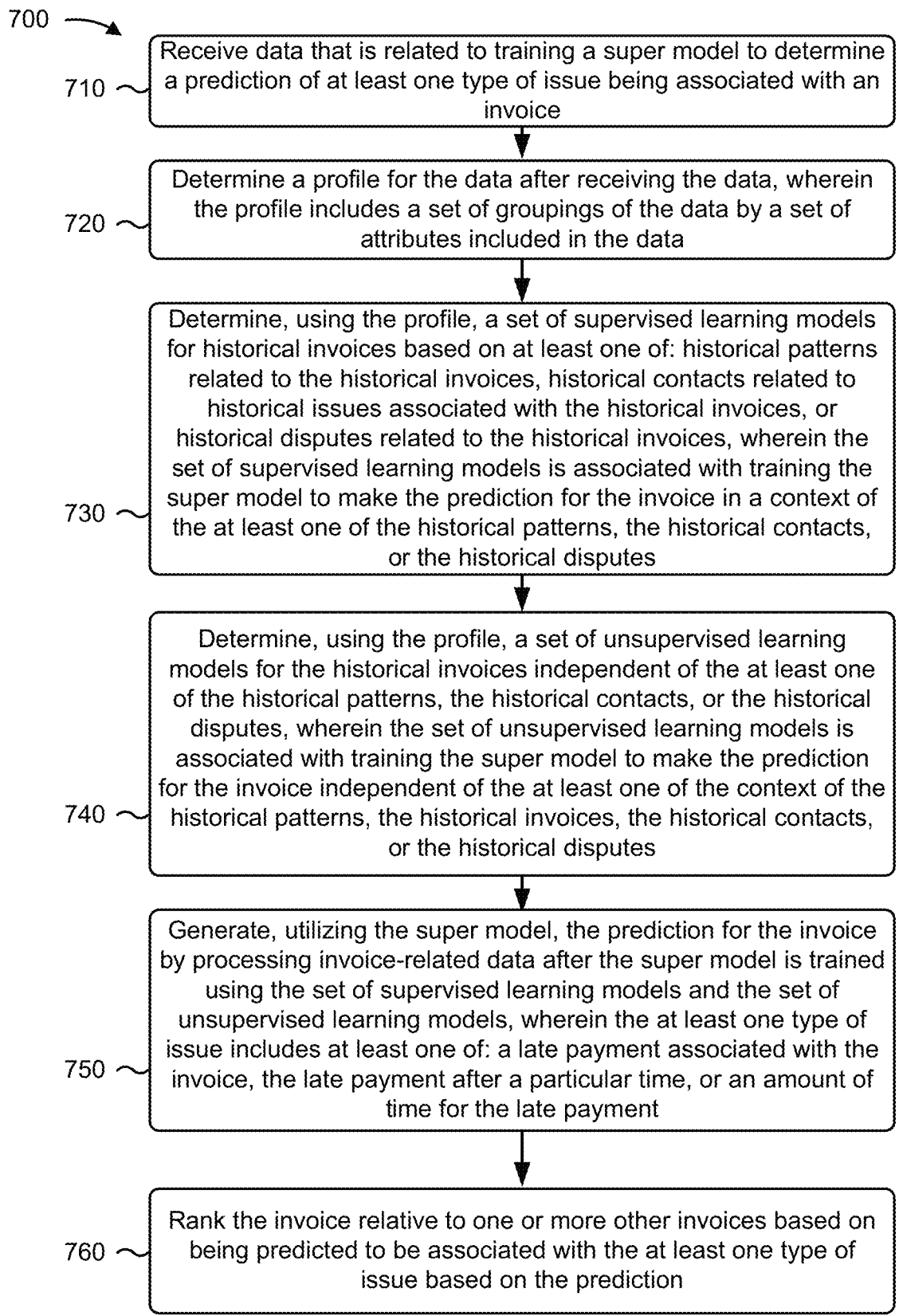

FIG. 7 is a flow chart of an example process 700 for predictive issue detection. In some implementations, one or more process blocks of FIG. 7 may be performed by an invoice analysis platform (e.g., invoice analysis platform 430). In some implementations, one or more process blocks of FIG. 7 may be performed by another device or a group of devices separate from or including the invoice analysis platform, such as a client device (e.g., client device 410), a server device (e.g., server device 420), and a computing resource (e.g., computing resource 434).

As shown in FIG. 7, process 700 may include receiving data that is related to training a super model to determine a prediction of at least one type of issue being associated with an invoice (block 710). For example, the invoice analysis platform (e.g., using computing resource 434, processor 520, input component 550, communication interface 570, and/or the like) may receive data that is related to training a super model to determine a prediction of at least one type of issue being associated with an invoice, in a manner that is the same as or similar to that described elsewhere herein.

As further shown in FIG. 7, process 700 may include determining a profile for the data after receiving the data, wherein the profile includes a set of groupings of the data by a set of attributes included in the data (block 720). For example, the invoice analysis platform (e.g., using computing resource 434, processor 520, and/or the like) may determine a profile for the data after receiving the data, in a manner that is the same as or similar to that described elsewhere herein. In some implementations, the profile includes a set of groupings of the data by a set of attributes included in the data.

As further shown in FIG. 7, process 700 may include determining, using the profile, a set of supervised learning models for historical invoices based on at least one of: historical patterns related to the historical invoices, historical contacts related to historical issues associated with the historical invoices, or historical disputes related to the historical invoices, wherein the set of supervised learning models is associated with training the super model to make the prediction for the invoice in a context of the at least one of the historical patterns, the historical contacts, or the historical disputes (block 730). For example, the invoice analysis platform (e.g., using computing resource 434, processor 520, and/or the like) may determine, using the profile, a set of supervised learning models for historical invoices based on at least one of: historical patterns related to the historical invoices, historical contacts related to historical issues associated with the historical invoices, or historical disputes related to the historical invoices, in a manner that is the same as or similar to that described elsewhere herein. In some implementations, the set of supervised learning models is associated with training the super model to make the prediction for the invoice in a context of the at least one of the historical patterns, the historical contacts, or the historical disputes.

As further shown in FIG. 7, process 700 may include determining, using the profile, a set of unsupervised learning models for the historical invoices independent of the at least one of the historical patterns, the historical contacts, or the historical disputes, wherein the set of unsupervised learning models is associated with training the super model to make the prediction for the invoice independent of the at least one of the context of the historical patterns, the historical invoices, the historical contacts, or the historical disputes (block 740). For example, the invoice analysis platform (e.g., using computing resource 434, processor 520, and/or the like) may determine, using the profile, a set of unsupervised learning models for the historical invoices independent of the at least one of the historical patterns, the historical contacts, or the historical disputes, in a manner that is the same as or similar to that described elsewhere herein. In some implementations, the set of unsupervised learning models is associated with training the super model to make the prediction for the invoice independent of the at least one of the context of the historical patterns, the historical invoices, the historical contacts, or the historical disputes.

As further shown in FIG. 7, process 700 may include generating, utilizing the super model, the prediction for the invoice by processing invoice-related data after the super model is trained using the set of supervised learning models and the set of unsupervised learning models, wherein the at least one type of issue includes at least one of: a late payment associated with the invoice, the late payment after a particular time, or an amount of time for the late payment (block 750). For example, the invoice analysis platform (e.g., using computing resource 434, processor 520, and/or the like) may generate, utilizing the super model, the prediction for the invoice by processing invoice-related data after the super model is trained using the set of supervised learning models and the set of unsupervised learning models, in a manner that is the same as or similar to that described elsewhere herein. In some implementations, the at least one type of issue includes at least one of: a late payment associated with the invoice, the late payment after a particular time, or an amount of time for the late payment.

As further shown in FIG. 7, process 700 may include ranking the invoice relative to one or more other invoices based on being predicted to be associated with the at least one type of issue based on the prediction (block 760). For example, the invoice analysis platform (e.g., using computing resource 434, processor 520, output component 560, communication interface 570, and/or the like) may rank the invoice relative to one or more other invoices based on being predicted to be associated with the at least one type of issue based on the prediction, in a manner that is the same as or similar to that described elsewhere herein.

Process 700 may include additional implementations, such as any single implementation or any combination of implementations described herein and/or in connection with one or more other processes described herein.

In some implementations, the invoice analysis platform may train the super model, utilizing the set of supervised learning models and the set of unsupervised learning models and prior to generating the prediction, to identify a likelihood of at least one type of issue being associated with the invoice. In some implementations, the invoice analysis platform may process, utilizing the super model, the invoice-related data to predict the likelihood of the at least one type of issue being associated with the invoice after training the super model.

In some implementations, the invoice analysis platform may determine, utilizing the super model, a score for the invoice after training the super model, wherein the score indicates the likelihood of the at least one type of issue being associated with the invoice; and may determine a priority for the invoice relative to one or more other invoices based on ranking the invoice. In some implementations, the invoice analysis platform may generate a collection plan for the invoice based on a priority for the invoice or at least one type issue predicted to be associated with the invoice; and may output information relating to the collection plan via a display after generating the collection plan.

In some implementations, the invoice analysis platform may determine, after ranking the invoice, a set of actions to perform and respective times at which to perform the set of actions based on the prediction related to the invoice, wherein the set of actions includes at least one of: sending a message to another device associated with an entity associated with the invoice, placing a robotic telephone call to a telephone associated with the entity, populating an electronic queue associated with a collection agent with information related to the invoice, or dispatching the collection agent to a location associated with the entity. In some implementations, the invoice analysis platform may determine that the invoice is outstanding at the particular time after determining the set of actions and the respective times at which to perform the set of actions; and may perform the set of actions at the respective times after determining that the invoice is outstanding at the particular time.

Although FIG. 7 shows example blocks of process 700, in some implementations process 700 may include additional blocks, fewer blocks, different blocks, or differently arranged blocks than those depicted in FIG. 7. Additionally, or alternatively, two or more of the blocks of process 700 may be performed in parallel.

Figure 8:
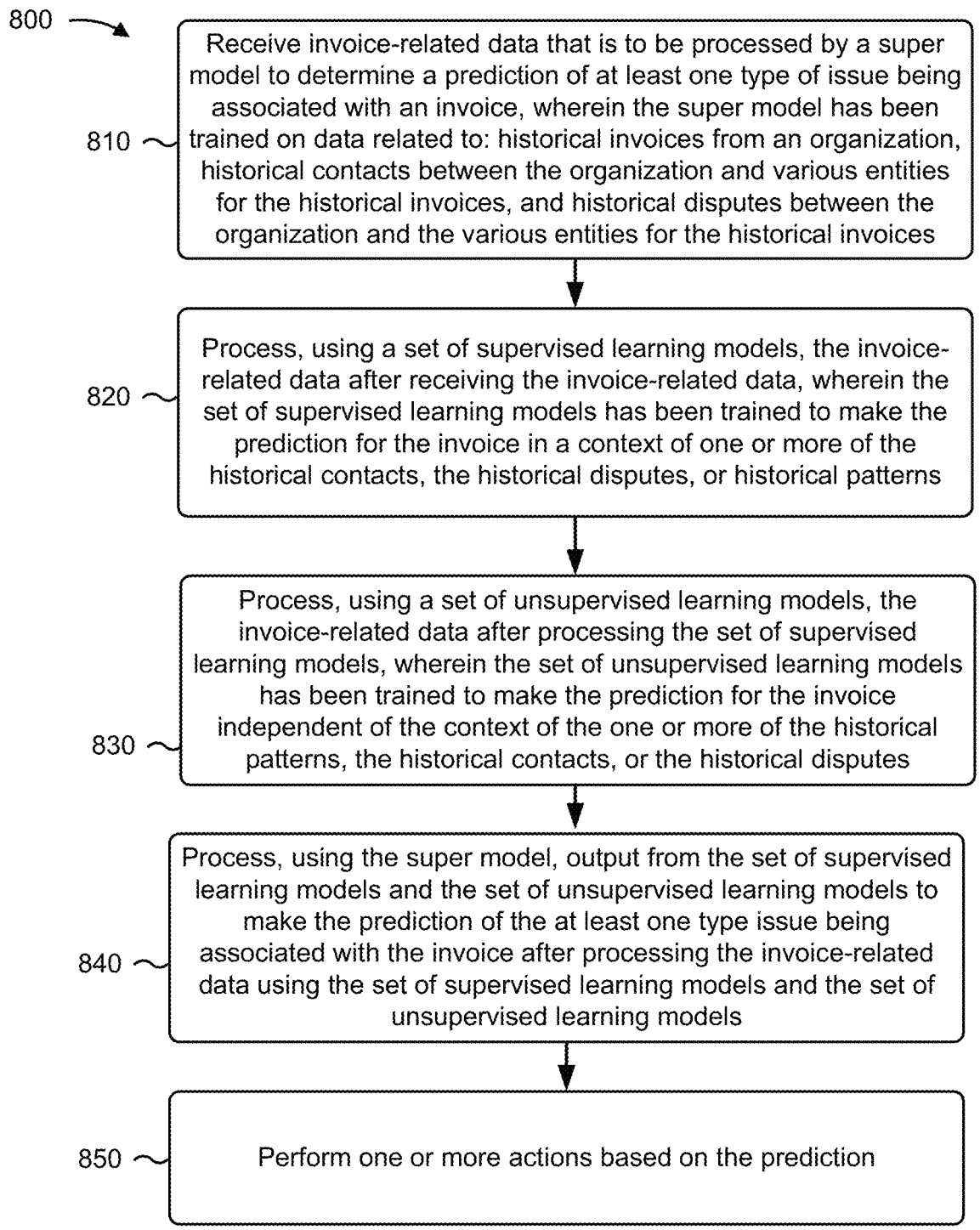

FIG. 8 is a flow chart of an example process 800 for predictive issue detection. In some implementations, one or more process blocks of FIG. 8 may be performed by an invoice analysis platform (e.g., invoice analysis platform 430). In some implementations, one or more process blocks of FIG. 8 may be performed by another device or a group of devices separate from or including the invoice analysis platform, such as a client device (e.g., client device 410), a server device (e.g., server device 420), and a computing resource (e.g., computing resource 434).

As shown in FIG. 8, process 800 may include receiving invoice-related data that is to be processed by a super model to determine a prediction of at least one type of issue being associated with an invoice, wherein the super model has been trained on data related to: historical invoices from an organization, historical contacts between the organization and various entities for the historical invoices, and historical disputes between the organization and the various entities for the historical invoices (block 810). For example, the invoice analysis platform (e.g., using computing resource 434, processor 520, input component 550, communication interface 570, and/or the like) may receive invoice-related data that is to be processed by a super model to determine a prediction of at least one type of issue being associated with an invoice, in a manner that is the same as or similar to that described elsewhere herein. In some implementations, the super model has been trained on data related to: historical invoices from an organization, historical contacts between the organization and various entities for the historical invoices, and historical disputes between the organization and the various entities for the historical invoices.

As further shown in FIG. 8, process 800 may include processing, using a set of supervised learning models, the invoice-related data after receiving the invoice-related data, wherein the set of supervised learning models has been trained to make the prediction for the invoice in a context of one or more of the historical contacts, the historical disputes, or historical patterns (block 820). For example, the invoice analysis platform (e.g., using computing resource 434, processor 520, and/or the like) may process, using a set of supervised learning models, the invoice-related data after receiving the invoice-related data, in a manner that is the same as or similar to that described elsewhere herein. In some implementations, the set of supervised learning models has been trained to make the prediction for the invoice in a context of one or more of the historical contacts, the historical disputes, or historical patterns.

As further shown in FIG. 8, process 800 may include processing, using a set of unsupervised learning models, the invoice-related data after processing the set of supervised learning models, wherein the set of unsupervised learning models has been trained to make the prediction for the invoice independent of the context of the one or more of the historical patterns, the historical contacts, or the historical disputes (block 830). For example, the invoice analysis platform (e.g., using computing resource 434, processor 520, and/or the like) may process, using a set of unsupervised learning models, the invoice-related data after processing the set of supervised learning models, in a manner that is the same as or similar to that described elsewhere herein. In some implementations, the set of unsupervised learning models has been trained to make the prediction for the invoice independent of the context of the one or more of the historical patterns, the historical contacts, or the historical disputes.

As further shown in FIG. 8, process 800 may include processing, using the super model, output from the set of supervised learning models and the set of unsupervised learning models to make the prediction of the at least one type issue being associated with the invoice after processing the invoice-related data using the set of supervised learning models and the set of unsupervised learning models (block 840). For example, the invoice analysis platform (e.g., using computing resource 434, processor 520, and/or the like) may process, using the super model, output from the set of supervised learning models and the set of unsupervised learning models to make the prediction of the at least one type issue being associated with the invoice after processing the invoice-related data using the set of supervised learning models and the set of unsupervised learning models, in a manner that tis the same as or similar to that described elsewhere herein.

As further shown in FIG. 8, process 800 may include performing one or more actions based on the prediction (block 850). For example, the invoice analysis platform (e.g., using computing resource 434, processor 520, and/or the like) may perform one or more actions based on the prediction, in a manner that is the same as or similar to that described elsewhere herein.

Process 800 may include additional implementations, such as any single implementation or any combination of implementations described herein and/or in connection with one or more other processes described herein.

In some implementations, the invoice analysis platform may train the set of supervised learning models and the set of unsupervised learning models using the data prior to receiving the invoice-related data; and may combine the set of supervised learning models and the set of unsupervised learning models into the super model after training the set of supervised learning models and the set of unsupervised learning models. In some implementations, the invoice analysis platform may combine the set of supervised learning models and the set of unsupervised learning models into at least one of: a random forest model, or a neural network, wherein the super model comprises the at least one of the random forest model or the neural network.

In some implementations, the invoice analysis platform may send a message to a device after processing the output from the set of supervised learning models and the set of unsupervised learning models, wherein the message includes information that identifies the invoice or the prediction. In some implementations, the invoice analysis platform may determine, after processing the output from the set of supervised learning models and the set of unsupervised learning models, that the invoice is associated with the at least one type of issue or one or more other types of issues; and may perform the one or more actions based on the at least one type of issue or the one or more other types of issues after determining that the invoice is associated with the at least one type of issue or the one or more other types of issues. In some implementations, the super model is associated with at least one of: predicting a late payment related to the invoice, predicting the late payment related to the invoice after a particular time, or predicting an amount of time payment related to the invoice will be outstanding.

Although FIG. 8 shows example blocks of process 800, in some implementations process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device, data that includes:
      invoice data related to historical invoices from an organization,
      contact data related to historical contacts between the organization and various entities for the historical invoices, and
      dispute data related to historical disputes between the organization and the various entities for the historical invoices;
   determining, by the device, a profile for the data after receiving the data,
      wherein the profile includes a set of groupings of the data by a set of attributes included in the data;
   determining, by the device and using the profile, a set of supervised learning models for the historical invoices based on one or more of:
      the historical contacts,
      the historical disputes, or
      historical patterns related to the historical invoices,
      wherein the set of supervised learning models is associated with training a super model to make a prediction for an invoice in a context of the one or more of the historical contacts, the historical disputes, the historical invoices, or the historical patterns;
   determining, by the device and using the profile, a set of unsupervised learning models for the historical invoices independent of the one or more of the historical contacts, the historical disputes, or the historical patterns,
      wherein the set of unsupervised learning models is associated with training the super model to make the prediction for the invoice independent of the context of the one or more of the historical contacts, the historical disputes, the historical invoices, or the historical patterns;
   determining, by the device and utilizing the super model, the prediction for the invoice after the super model is trained using the set of supervised learning models and the set of unsupervised learning models,
      wherein the prediction indicates a likelihood of at least one type of issue being associated with the invoice; and
   performing, by the device, one or more actions based on the prediction.

2. The method of claim 1, wherein determining the set of supervised learning models is based on a set of models that includes:
   a linear regression model,
   an ensemble-based model, or
   a neural network.

3. The method of claim 1, wherein determining the set of unsupervised learning models is based on a set of models that includes:
   a k-means clustering model,
   a kernel density estimation (KDE) model, or
   an isolation forest.

4. The method of claim 1, wherein determining the profile is based on respective geographic locations associated with the various entities or the historical invoices.

5. The method of claim 1, wherein the set of supervised learning models identifies accurately predicted historical invoices and inaccurately predicted historical invoices.

6. The method of claim 1, wherein the set of unsupervised learning models identifies subsets of the historical invoices that correspond to particular patterns of the data.

7. The method of claim 1, wherein performing the one or more actions comprises:
   flagging the invoice as being predicted to be associated with the at least one type of issue or to not be associated with the at least one type of issue based on the prediction; and
   storing, in a data structure, information that identifies the invoice and whether the invoice is predicted to be associated with the at least one type of issue or to not be associated with the at least one type of issue.

8. A device, comprising:
   one or more memories; and
   one or more processors, communicatively coupled to the one or more memories, to:
      receive data that is related to training a super model to determine a prediction of at least one type of issue being associated with an invoice;
      determine a profile for the data after receiving the data,
         wherein the profile includes a set of groupings of the data by a set of attributes included in the data;
      determine, using the profile, a set of supervised learning models for historical invoices based on at least one of:
         historical patterns related to the historical invoices,
         historical contacts related to historical issues associated with the historical invoices, or
         historical disputes related to the historical invoices, wherein the set of supervised learning models is associated with training the super model to make the prediction for the invoice in a context of the at least one of the historical patterns, the historical contacts, or the historical disputes;

determine, using the profile, a set of unsupervised learning models for the historical invoices independent of the at least one of the historical patterns, the historical contacts, or the historical disputes, wherein the set of unsupervised learning models is associated with training the super model to make the prediction for the invoice independent of the at least one of the context of the historical patterns, the historical invoices, the historical contacts, or the historical disputes;

generate, utilizing the super model, the prediction for the invoice by processing invoice-related data after the super model is trained using the set of supervised learning models and the set of unsupervised learning models, wherein the at least one type of issue includes at least one of:
 a late payment associated with the invoice,
 the late payment after a particular time, or
 an amount of time for the late payment; and rank the invoice relative to one or more other invoices based on being predicted to be associated with the at least one type of issue based on the prediction.

9. The device of claim 8, wherein the one or more processors are further to:
train the super model, utilizing the set of supervised learning models and the set of unsupervised learning models and prior to generating the prediction, to identify a likelihood of at least one type of issue being associated with the invoice.

10. The device of claim 9, wherein the one or more processors, when generating the prediction, are to:
process, utilizing the super model, the invoice-related data to predict the likelihood of the at least one type of issue being associated with the invoice after training the super model.

11. The device of claim 10, wherein the one or more processors, when generating the prediction, are to:
determine, utilizing the super model, a score for the invoice after training the super model,
 wherein the score indicates the likelihood of the at least one type of issue being associated with the invoice; and
wherein the one or more processors are further to:
 determine a priority for the invoice relative to one or more other invoices based on ranking the invoice.

12. The device of claim 8, wherein the one or more processors are further to:
generate a collection plan for the invoice based on a priority for the invoice or the at least one type issue predicted to be associated with the invoice; and
output information relating to the collection plan via a display after generating the collection plan.

13. The device of claim 8, wherein the one or more processors are further to:
determine, after ranking the invoice, a set of actions to perform and respective times at which to perform the set of actions based on the prediction related to the invoice,
 wherein the set of actions includes at least one of:
  sending a message to another device associated with an entity associated with the invoice,
  placing a robotic telephone call to a telephone associated with the entity,
  populating an electronic queue associated with a collection agent with information related to the invoice, or
  dispatching the collection agent to a location associated with the entity.

14. The device of claim 13, wherein the one or more processors are further to:
determine that the invoice is outstanding at the particular time after determining the set of actions and the respective times at which to perform the set of actions; and
perform the set of actions at the respective times after determining that the invoice is outstanding at the particular time.

15. A non-transitory computer-readable medium storing instructions, the instructions comprising:
one or more instructions that, when executed by one or more processors, cause the one or more processors to:
 receive invoice-related data that is to be processed by a super model to determine a prediction of at least one type of issue being associated with an invoice,
  wherein the super model has been trained on data related to:
   historical invoices from an organization,
   historical contacts between the organization and various entities for the historical invoices, and
   historical disputes between the organization and the various entities for the historical invoices;
 process, using a set of supervised learning models, the invoice-related data after receiving the invoice-related data,
  wherein the set of supervised learning models has been trained to make the prediction for the invoice in a context of one or more of the historical contacts, the historical disputes, or historical patterns;
 process, using a set of unsupervised learning models, the invoice-related data after processing the set of supervised learning models,
  wherein the set of unsupervised learning models has been trained to make the prediction for the invoice independent of the context of the one or more of the historical patterns, the historical contacts, or the historical disputes;
 process, using the super model, output from the set of supervised learning models and the set of unsupervised learning models to make the prediction of the at least one type issue being associated with the invoice after processing the invoice-related data using the set of supervised learning models and the set of unsupervised learning models; and
 perform one or more actions based on the prediction.

16. The non-transitory computer-readable medium of claim 15, wherein the one or more instructions, when executed by the one or more processors, further cause the one or more processors to:
train the set of supervised learning models and the set of unsupervised learning models using the data prior to receiving the invoice-related data; and
combine the set of supervised learning models and the set of unsupervised learning models into the super model after training the set of supervised learning models and the set of unsupervised learning models.

17. The non-transitory computer-readable medium of claim 16, wherein the one or more instructions, that cause the one or more processors to combine the set of supervised learning models and the set of unsupervised learning models into the super model, cause the one or more processors to:
combine the set of supervised learning models and the set of unsupervised learning models into at least one of:
a random forest model, or
a neural network,
wherein the super model comprises the at least one of the random forest model or the neural network.

18. The non-transitory computer-readable medium of claim 15, wherein the one or more instructions, that cause the one or more processors to perform the one or more actions, cause the one or more processors to:
send a message to a device after processing the output from the set of supervised learning models and the set of unsupervised learning models,
wherein the message includes information that identifies the invoice or the prediction.

19. The non-transitory computer-readable medium of claim 15, wherein the one or more instructions, when executed by the one or more processors, further cause the one or more processors to:
determine, after processing the output from the set of supervised learning models and the set of unsupervised learning models, that the invoice is associated with the at least one type of issue or one or more other types of issues; and
wherein the one or more instructions, that cause the one or more processors to perform the one or more actions, cause the one or more processors to:
perform the one or more actions based on the at least one type of issue or the one or more other types of issues after determining that the invoice is associated with the at least one type of issue or the one or more other types of issues.

20. The non-transitory computer-readable medium of claim 19, wherein the super model is associated with at least one of:
predicting a late payment related to the invoice,
predicting the late payment related to the invoice after a particular time, or
predicting an amount of time payment related to the invoice will be outstanding.

* * * * *